(12) United States Patent
Zang et al.

(10) Patent No.: US 11,924,358 B2
(45) Date of Patent: Mar. 5, 2024

(54) METHOD FOR ISSUING DIGITAL CERTIFICATE, DIGITAL CERTIFICATE ISSUING CENTER, AND MEDIUM

(71) Applicant: Tencent Technology (Shenzhen) Company Limited, Shenzhen (CN)

(72) Inventors: Jun Zang, Shenzhen (CN); Jianjun Zhang, Shenzhen (CN); Luohai Zheng, Shenzhen (CN); Junjie Shi, Shenzhen (CN); Hujia Chen, Shenzhen (CN); Zichao Tang, Shenzhen (CN); Yige Cai, Shenzhen (CN); Qing Qin, Shenzhen (CN); Chuanbing Dai, Shenzhen (CN); Hu Lan, Shenzhen (CN); Jinlong Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 499 days.

(21) Appl. No.: 17/171,937

(22) Filed: Feb. 9, 2021

(65) Prior Publication Data

US 2021/0167972 A1 Jun. 3, 2021

Related U.S. Application Data

(63) Continuation of application No. PCT/CN2019/128755, filed on Dec. 26, 2019.

(30) Foreign Application Priority Data

Jan. 9, 2019 (CN) .......................... 201910020435.5

(51) Int. Cl.
*H04L 9/32* (2006.01)
*H04L 9/40* (2022.01)

(52) U.S. Cl.
CPC .......... *H04L 9/3263* (2013.01); *H04L 9/3247* (2013.01); *H04L 63/0823* (2013.01)

(58) Field of Classification Search
None
See application file for complete search history.

(56) References Cited

U.S. PATENT DOCUMENTS

| | | | |
|---|---|---|---|
| 6,615,350 B1 * | 9/2003 | Schell ................. | H04L 63/0869 713/168 |
| 11,196,573 B2 * | 12/2021 | Roennow ............ | H04L 63/0435 |

(Continued)

FOREIGN PATENT DOCUMENTS

| | | | | |
|---|---|---|---|---|
| CN | 108369697 A | | 8/2018 | |
| CN | 108390872 A | * | 8/2018 | ......... H04L 63/0823 |

(Continued)

OTHER PUBLICATIONS

Tencent Technology, WO, PCT/CN2019/128755, dated Mar. 12, 2020, 5 pgs.

(Continued)

*Primary Examiner* — Jeffrey C Pwu
*Assistant Examiner* — Mayasa A. Shaawat
(74) *Attorney, Agent, or Firm* — Morgan, Lewis & Bockius LLP

(57) ABSTRACT

This application provides a method for issuing a digital certificate performed by a digital certificate issuing center that includes a public-private key generation module and an authentication module. The method includes: receiving a public-private key request from a node in a blockchain network; generating a public key and a private key of the node by using the public-private key generation module, and transmitting the public and private keys to the node; receiving the public key of the node and registration information of the node, and authenticating the registration information (Continued)

by using the authentication module; and generating, in accordance with a determination that the authentication succeeds, a digital certificate of the node by using the authentication module, and transmitting the digital certificate to the node. The embodiments of this application can improve the probative value of an issued digital certificate, thereby improving the security of data exchange in a blockchain network.

16 Claims, 28 Drawing Sheets

(56) References Cited

U.S. PATENT DOCUMENTS

| | | | |
|---|---|---|---|
| 2018/0115538 A1 | 4/2018 | Blake | |
| 2018/0123790 A1* | 5/2018 | Itamar | G06F 16/21 |
| 2018/0137284 A1 | 5/2018 | Oh et al. | |
| 2018/0322491 A1 | 11/2018 | Madisetti et al. | |
| 2018/0374091 A1 | 12/2018 | Madisetti et al. | |
| 2019/0182237 A1* | 6/2019 | Queralt | H04L 63/123 |

FOREIGN PATENT DOCUMENTS

| | | | | |
|---|---|---|---|---|
| CN | 108390872 A | 8/2018 | | |
| CN | 108712429 A | 10/2018 | | |
| CN | 108900507 A | 11/2018 | | |
| CN | 109003083 A | 12/2018 | | |
| CN | 109150539 A | 1/2019 | | |
| CN | 109617698 A | 4/2019 | | |
| EP | 3859647 A1 * | 8/2021 | | G06F 21/64 |
| JP | 2018174507 A | 11/2018 | | |
| WO | WO-2015127789 A1 * | 9/2015 | | H04L 9/30 |

OTHER PUBLICATIONS

Tencent Technology, IPRP, PCT/CN2019/128755, dated Jun. 16, 2021, 6 pgs.

Yoshiki Higashikado et al., "A Study on Certificate Management in Consortium Chain", 2017 Cryptography and Information Security Symposium (SCIS2017), Japan, The Institute of Electronics, Information and Communication Engineers, Jan. 24, 2017, 8 pgs.

Tencent Technology, ISR, PCT/CN2019/128755, dated Mar. 12, 2020, 2 pgs.

* cited by examiner

Registration succeeds, and an issued digital certificate is as follows:
Sig=Encl_by_CA_prikey [hash(info)]
Plaintext information-info
· Version number
· Signature algorithm
· CA public key
· Enterprise ID
· Public key of the enterprise
· Issuing institution identifier
· Valid time
· Certificate status information Verify

FIG. 3E

Verification on a digital certificate succeeds.

An invoice has been issued, and invoice information is as follows:
Invoice issuing organization: XXXXX
Invoice identifier: XXXXXX
Taxpayer identification number of the invoice issuing organization:
XXXXXXX
Person receiving the invoice: XX
Reimbursement organization: XXXXX
Taxpayer identification number of the reimbursement organization:
XXXXXXX Transmit to an accounting node.

FIG. 3G

It is necessary to perform signing and transmission to the accounting node. Obtain a private key for signing?

Yes

FIG. 3H

Invoice issuing information has been linked.

FIG. 3K

Request to issue a public key and a private key.

METHOD FOR ISSUING DIGITAL CERTIFICATE, DIGITAL CERTIFICATE ISSUING CENTER, AND MEDIUM

CROSS REFERENCE TO RELATED APPLICATIONS

This application is a continuation application of PCT Patent Application No. PCT/CN2019/128755, entitled "METHODS FOR IS SUING DIGITAL CERTIFICATES, DIGITAL CERTIFICATION CENTERS, AND MEDIA" filed on Dec. 26, 2019, which claims priority to Chinese Patent Application No. 201910020435.5, filed with the State Intellectual Property Office of the People's Republic of China on Jan. 9, 2019, and entitled "METHOD FOR ISSUING DIGITAL CERTIFICATE, DIGITAL CERTIFICATE ISSUING CENTER, AND MEDIUM", all of which are incorporated herein by reference in their entirety.

FIELD OF THE TECHNOLOGY

This application relates to the field of blockchains, and specifically, to a technology for issuing a digital certificate to a node in a blockchain network.

BACKGROUND OF THE DISCLOSURE

In a conventional blockchain network system, a public blockchain, a consortium blockchain, and a private blockchain are all products of technological development. The public blockchain can achieve a high degree of decentralization and the highest credibility and security, but has the lowest transaction speed. The private blockchain can achieve a very low degree of decentralization but has a high transaction speed and is the most suitable for supervision. The consortium blockchain can achieve partial decentralization with a degree of decentralization between that of the public blockchain and that of the private blockchain, has a relatively high transaction speed, and is also highly suitable for supervision. The three types of blockchains have different features and are applicable to different scenarios.

Regardless of the type of a blockchain network system, some data such as linking information and a query request often needs to be transmitted in the blockchain network system in the process of linking a data block to a blockchain and querying a data block. To improve security, when transmitting data, a transmitter is usually required to sign the data by using a key of the transmitter, and when receiving a signature and the data, a receiver is usually required to verify the signature by using the key of the transmitter. Therefore, the obtaining of the key of the transmitter is involved. To ensure the security and authority of the key, a digital certificate needs to be issued to the transmitter, to prove that the issued key is secure and authoritative. However, a process of issuing a digital certificate to a node in the related art is isolated, and the node has an allocated key and is issued with a digital certificate. However, the process of issuing a digital certificate in the related art cannot prove that the issued digital certificate necessarily corresponds to the key. As a result, the digital certificate has relatively low probative value and authority.

SUMMARY

An objective of this application is to provide a method for issuing a digital certificate to a node in a blockchain network, a digital certificate issuing center, and a medium, which can improve the probative value of an issued digital certificate, thereby improving the security of data exchange in a blockchain network.

According to an aspect of the embodiments of this application, a method for issuing a digital certificate to a node in a blockchain network is provided, the method being performed by a digital certificate issuing center, the digital certificate issuing center including a public-private key generation module and an authentication module, the method including: receiving a public-private key request from a node in a blockchain network; generating, in response to the public-private key request, a public key and a private key of the node for the node by using the public-private key generation module, and transmitting the public key and the private key to the node; receiving the public key of the node and registration information of the node by using the authentication module, and authenticating the registration information by using the authentication module; and generating, in accordance with a determination that the authentication succeeds, a digital certificate of the node by using the authentication module, and transmitting the digital certificate to the node, the digital certificate including plaintext information and a signature formed from the plaintext information by using a private key of the authentication module, for the node to verify the signature by using a public key of the authentication module, the plaintext information including the public key of the node.

According to an aspect of the embodiments of this application, a digital certificate issuing center is disclosed. The digital certificate issuing center includes: a public-private key generation module, configured to: receive a public-private key request from a node in a blockchain network; generate, in response to the public-private key request, a public key and a private key of the node for the node, and transmit the public key and the private key to the node; and an authentication module, configured to: receive the public key of the node and registration information of the node, authenticate the registration information, generate, in accordance with a determination that the authentication succeeds, a digital certificate of the node, and transmit the digital certificate to the node, the digital certificate including plaintext information and a signature formed from the plaintext information by using a private key of the authentication module, for the node to verify the signature by using a public key of the authentication module, the plaintext information including the public key of the node.

According to an aspect of the embodiments of this application, a computing device acting as a digital certificate issuing center for issuing a digital certificate to a node in a blockchain network, the digital certificate issuing center comprising a public-private key generation module and an authentication module, is disclosed, including: a memory, storing computer-readable instructions; and a processor, reading the computer-readable instructions stored in the memory, to perform the method described above.

According to an aspect of the embodiments of this application, a non-transitory computer program medium is disclosed, storing computer-readable instructions for issuing a digital certificate to a node in a blockchain network, the computer-readable instructions, when being executed by a processor of a computing device acting as a digital certificate issuing center including a public-private key generation module and an authentication module, causing the computing device to perform the method described above.

According to an aspect of the embodiments of this application, a computer program product is disclosed, including instructions, the instructions, when run on a computer, causing the computer to perform the method described above.

The issuance of a digital certificate in the related art is isolated. Consequently, the probative value for the validity of a public key and a private key of a node is relatively low. In the embodiments of this application, a digital certificate issuing center includes a public-private key generation module and an authentication module. After the public-private key generation module generates a public key and a private key for a node, the node needs to transmit the public key and registration information together to the authentication module for authentication. After the authentication succeeds, a digital certificate returned to the node includes the public key. In this way, the probative value of the digital certificate for the issued public key and the issued private key is relatively high. In addition, the digital certificate includes a signature formed by using a private key of the authentication module, and after the digital certificate is returned to the node, the node may perform signature verification on the signature by using a public key of the authentication module. Because the signature is verifiable, the probative value and public credibility of the digital certificate are improved. Therefore, the public key and the private key that are guaranteed by the digital certificate are used to exchange data in a blockchain network, thereby improving the security of data exchange in the blockchain network.

Other features and advantages of this application become obvious through the following detailed descriptions, or may be partially learned through the practice of this application.

It is to be understood that the foregoing general descriptions and the following detailed descriptions are only exemplary, and cannot limit this application.

BRIEF DESCRIPTION OF THE DRAWINGS

The above and other objectives, features, and advantages of this application will become more apparent from the detailed description of exemplary embodiments of this application with reference to the accompanying drawings.

FIG. 3A to FIG. 3K are diagrams of a display interface of a node in a case in which a method for issuing a digital certificate to a node in a blockchain network is applied to an electronic invoice application scenario according to an embodiment of this application.

FIG. 4A to FIG. 4K are diagrams of a display interface of a node in a case in which a method for issuing a digital certificate to a node in a blockchain network is applied to an electronic invoice application scenario according to an embodiment of this application.

DESCRIPTION OF EMBODIMENTS

Figure 1A:
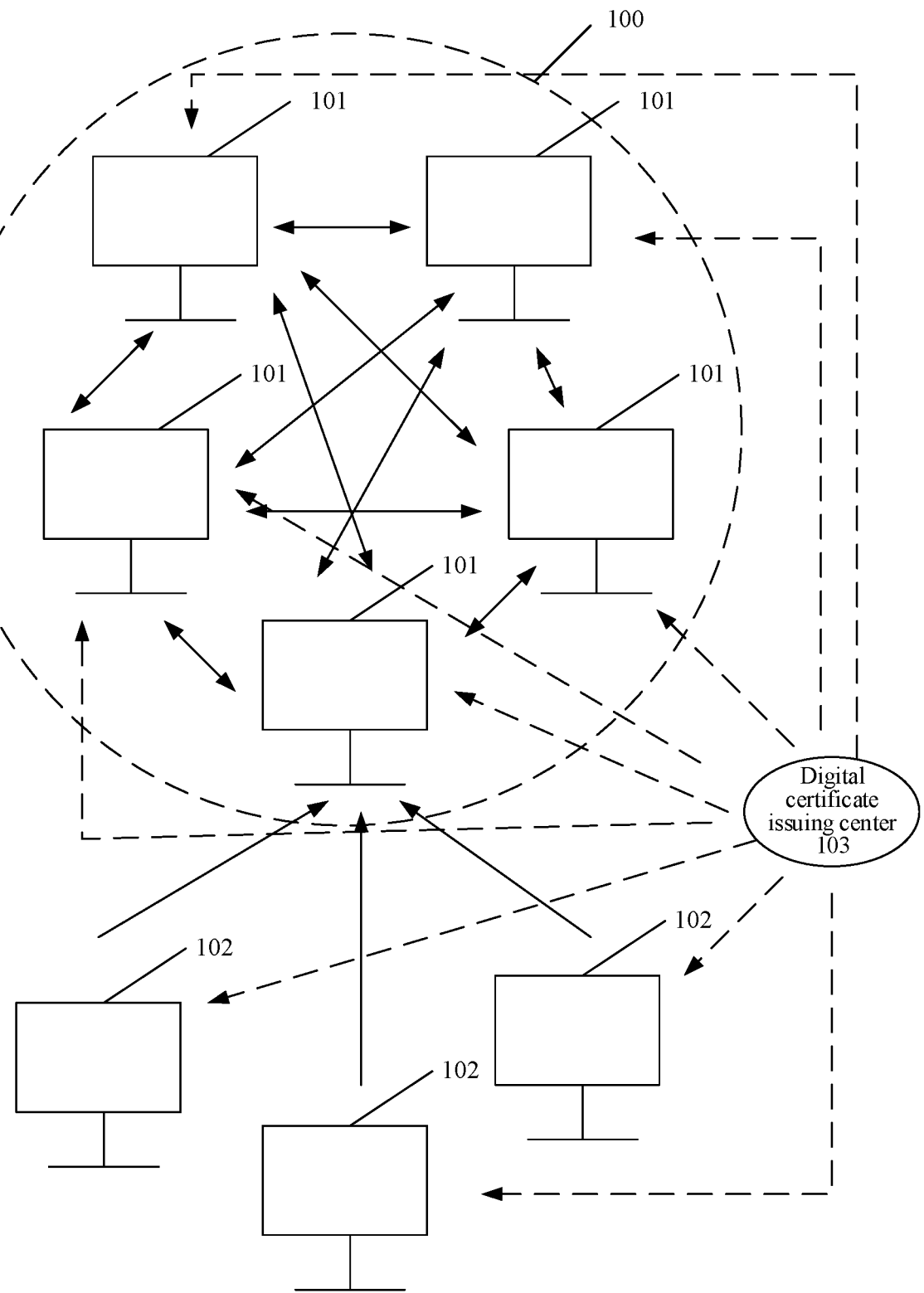
FIG. 1A to FIG. 1C are diagrams of three system architectures of a method for issuing a digital certificate to a node in a blockchain network according to an embodiment of this application.

Exemplary implementations are now described more comprehensively with reference to the accompanying drawings. However, the exemplary implementations can be implemented in various forms, and it is not to be understood as being limited to the examples described herein. On the contrary, the exemplary implementations are provided to make the descriptions of this application more comprehensive and complete, and comprehensively convey the idea of the exemplary implementations to a person skilled in the art. The accompanying drawings are merely exemplary illustrations of this application and are not necessarily drawn to scale. The same reference numbers in the drawings represent the same or similar parts, and therefore, repeated descriptions thereof are omitted.

In addition, the described features, structures, or characteristics may be combined in one or more exemplary implementations in any appropriate manner. In the following description, many specific details are provided to give a full understanding of the exemplary implementations of this application. However, a person skilled in the art is to be aware that, the technical solutions in this application may be implemented without one or more of the particular details, or another method, unit, or step may be used. In other cases, well-known structures, methods, implementations, or operations are not shown or described in detail, in order not to obscure the aspects of this application.

Some of the block diagrams shown in the accompanying drawings are functional entities and do not necessarily correspond to physically or logically independent entities. Such functional entities may be implemented by using software, or implemented in one or more hardware modules or integrated circuits, or implemented in different networks and/or processor apparatuses and/or micro-controller apparatuses.

The method provided in the embodiments of this application is applied to a blockchain. The blockchain is a novel application mode of computer technologies such as distributed data storage, point-to-point transmission, a consensus mechanism, and an encryption algorithm. The blockchain is essentially a decentralized database and is a string of data blocks generated through association by using a cryptographic method. Each data block includes information of a batch of network transactions, the information being used for verifying the validity of information of the data block (anti-counterfeiting) and generating a next data block. The blockchain may include a blockchain underlying platform, a platform product service layer, and an application service layer.

The blockchain underlying platform may include processing modules such as a user management module, a basic service module, an intelligent contract module, and an operation supervision module. The user management module is responsible for identity information management of all blockchain participants, including maintaining public-private key generation (account management), key management, maintaining a correspondence between the real identity of a user and a blockchain address (permission management), and the like, supervising and auditing transaction conditions of some real identities with authorization, and providing rule configuration of risk control (risk control auditing). The basic service module is deployed on all blockchain node devices and configured to verify the validity of a service request, and after a consensus is reached on a valid request, record the valid request in storage. For a new service request, the basic service module first parses interface adaptation and performs authentication processing (interface adaptation), then encrypts service information by using a consensus algorithm (consensus management), transmits the complete and consistent service information after encryption to a shared ledger (network communication), and performs recording and storing. The intelligent contract module is responsible for contract registration and publication, contract triggering, and contract execution. A developer may define contract logic by using a programming language, and release the contract logic onto a blockchain (contract registration). According to the logic of contract items, a key or another event is invoked to trigger execution, to complete the contract logic. The function of upgrading or canceling a contract is further provided. The operation supervision module is mainly responsible for deployment, configuration modification, contract setting, and cloud adaptation during product releasing and visualized output of a real-time status during product operation, for example, alarming, monitoring network conditions, and monitoring a health status of a node device.

The platform product service layer provides basic capabilities and an implementation framework of a typical application. Based on these basic capabilities, developers may superpose characteristics of services and complete blockchain implementation of service logic. The application service layer provides a blockchain solution-based application service for use by a service participant.

A system architecture and an entire procedure to which this embodiment of this application is applied are first described below with reference to FIG. 1A to FIG. 1C.

FIG. 1A shows a system architecture of a blockchain network to which this embodiment of this application is applied. The system architecture includes an accounting node sub-network 100, a transaction information generator node 102, and a digital certificate issuing center 103. The accounting node sub-network 100 includes a plurality of accounting nodes 101. The transaction information generator node 102 and the accounting node 101 have different permissions in the entire blockchain system architecture. The accounting node 101 has the right to keep accounts (the right to generate a data block and link the data block to a chain). The transaction information generator node 102 does not have the right to keep accounts, but only has the right to generate transaction information and apply for account keeping. In addition, the transaction information generator node cannot check whether the accounts kept by the accounting node 101 are correct and can only passively trust the accounts kept by the accounting node 101. Each transaction information generator node 102 has an accounting node 101 corresponding to the transaction information generator node. After generating transaction information, the transaction information generator node 102 may transmit the transaction information to the corresponding accounting node 101 and apply for account keeping, so as to complete linking.

In the process of linking the data block, various information needs to be exchanged between the accounting nodes 101 included in the accounting node sub-network 100 and between the accounting nodes 101 and the transaction information generator node 102. To ensure information security of the exchange, a transmitter needs to sign information by using a private key of the transmitter, and transmit a signature and the information together. A node receiving the signature and the information may verify the signature by using a public key of the transmitter. Because of the presence of the public key and the private key, the function of the digital certificate issuing center 103 is fulfilled. The digital certificate issuing center 103 can acknowledge the validity of the public key and the private key.

Figure 1B:
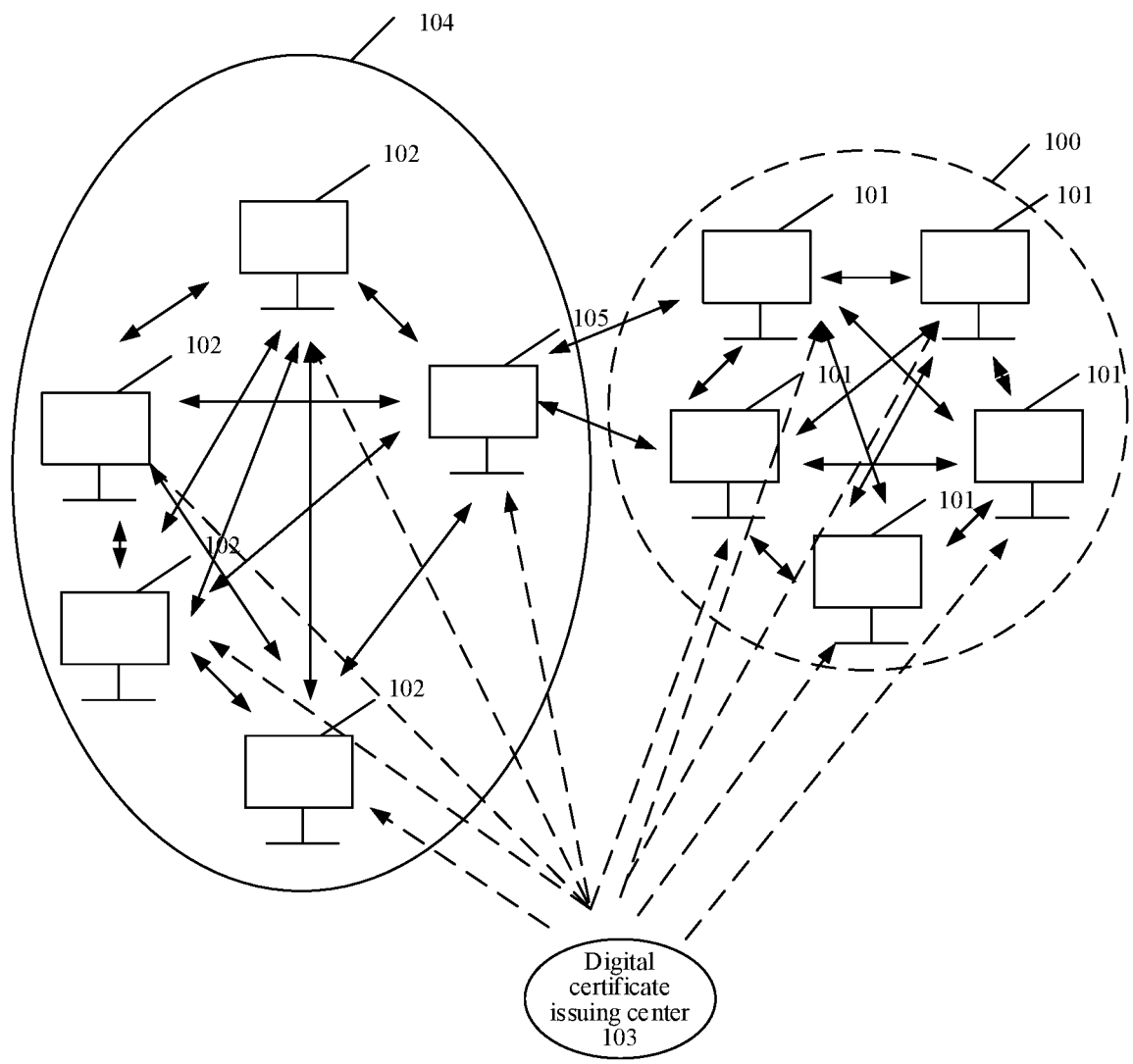

FIG. 1B shows a system architecture of another blockchain network to which this embodiment of this application is applied. The system architecture includes an accounting node sub-network 100, a service node sub-network 104, and a digital certificate issuing center 103. A difference between the system architecture and the system architecture in FIG. 1A lies in that the system architecture includes the service node sub-network 104 formed by service nodes 102. A difference between the service node 102 and the transaction information generator node 102 in FIG. 1A lies in that the service node 102 cannot keep accounts but can verify accounts kept by the accounting node 101. The accounting node sub-network 100 is connected to the service node sub-network 104 by a proxy node 105. The proxy node 105 is a special node belonging to the service node sub-network 104. The proxy node 105 performs data transmission in a bidirectional manner. The proxy node can transmit, to the service node 102, information that needs to be transmitted by the accounting node 101 to the service node 102, and can also transmit transaction information generated by the service node 102 to the accounting node 101 to complete linking. The service node 102 generates various transaction information that needs to be linked, and the transaction information is transmitted to one accounting node 101 by using the proxy node 105. The accounting node 101 encapsulates and links a plurality of pieces of received transaction information by using a leader accounting node elected from all the accounting nodes 101. The leader accounting node generates a digest of the plurality of pieces of transaction information that are encapsulated, generates a signature by using a private key of the leader accounting node, puts the digest and the signature into a block header, and returns the block header to the service node 102. The service node 102 may perform signature verification on the signature by using a public key of the leader accounting node. Herein, the public key and the private key of the leader accounting node are involved. Therefore, a digital certificate issued by the digital certificate issuing center 103 needs to ensure the validity of the public key and the private key of the leader accounting node.

The service node 102 only receives the block header transmitted from the accounting node 101, and if the service node intends to query specific transaction information in a block body, the service node needs to transmit a query request for the transaction information to the proxy node 105. To verify that the query request is transmitted by a valid service node 102, the service node 102 needs to sign the query request by using a private key of the service node 102. The proxy node 105 performs signature verification on the query request by using a public key of the service node 102, to prove that the query request is transmitted by the service node 102 and there is no transmission loss. Herein, the public key and the private key of the service node are involved. Therefore, a digital certificate issued by the digital certificate issuing center 103 needs to ensure the validity of the public key and the private key of the service node.

Figure 1C:
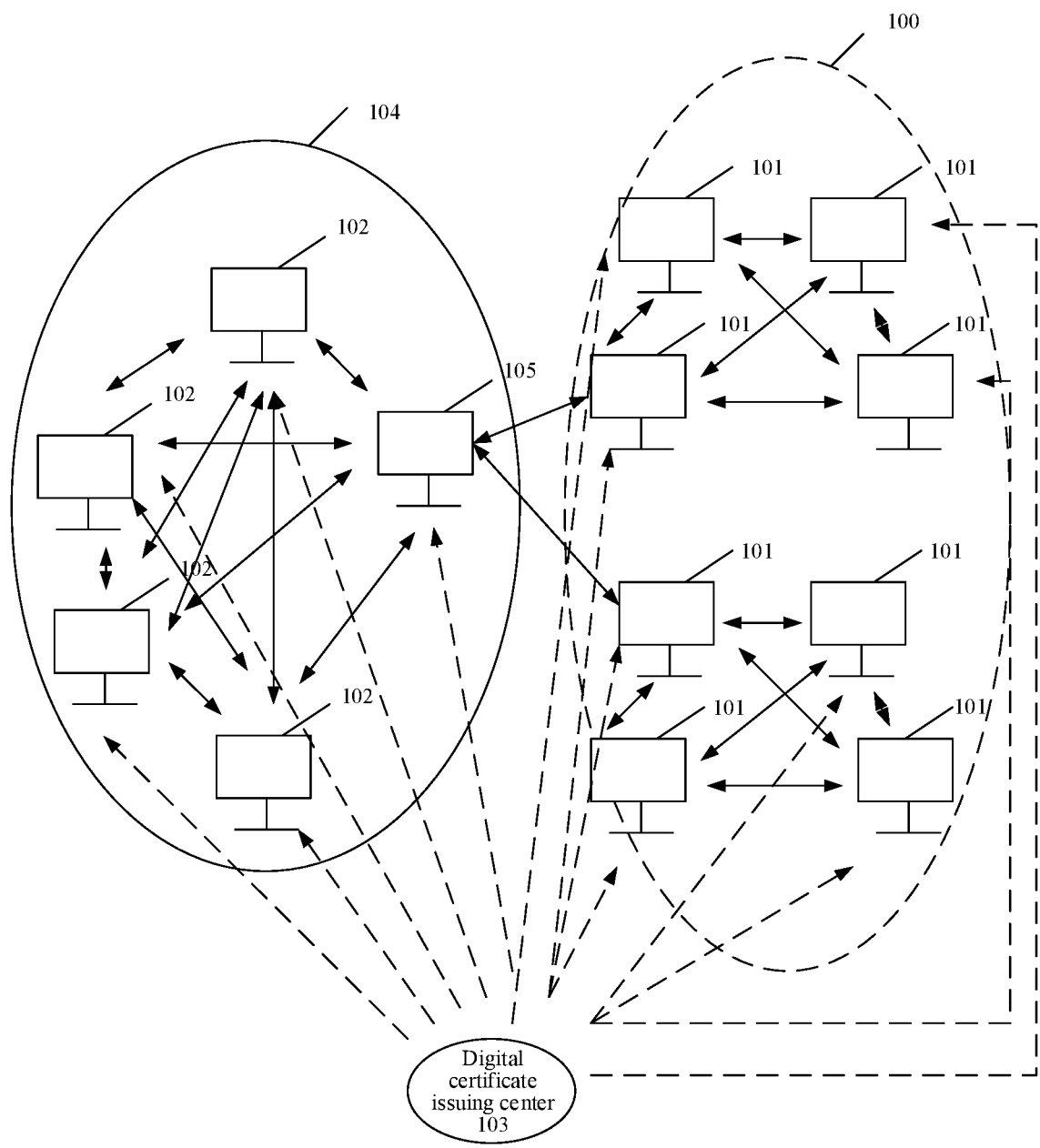

FIG. 1C shows a system architecture of another blockchain network to which this embodiment of this application is applied. A difference between the system architecture and the system architecture in FIG. 1B lies in that an accounting node sub-network 100 of the system architecture is divided into a plurality of branch accounting node sub-networks. Each branch accounting node sub-network may be responsible for the recording of one type of transaction information. For example, an accounting node in a branch accounting node sub-network A is responsible for the recording of blockchain finance transaction information, and an accounting node in a branch accounting node sub-network B is responsible for the recording of electronic invoice transaction information. In FIG. 1C, the public key and the private key of the leader accounting node or the public key and the private key of the service node 102 also need to perform signing and signature verification, a process of which is similar to that in FIG. 1B.

Figure 2:
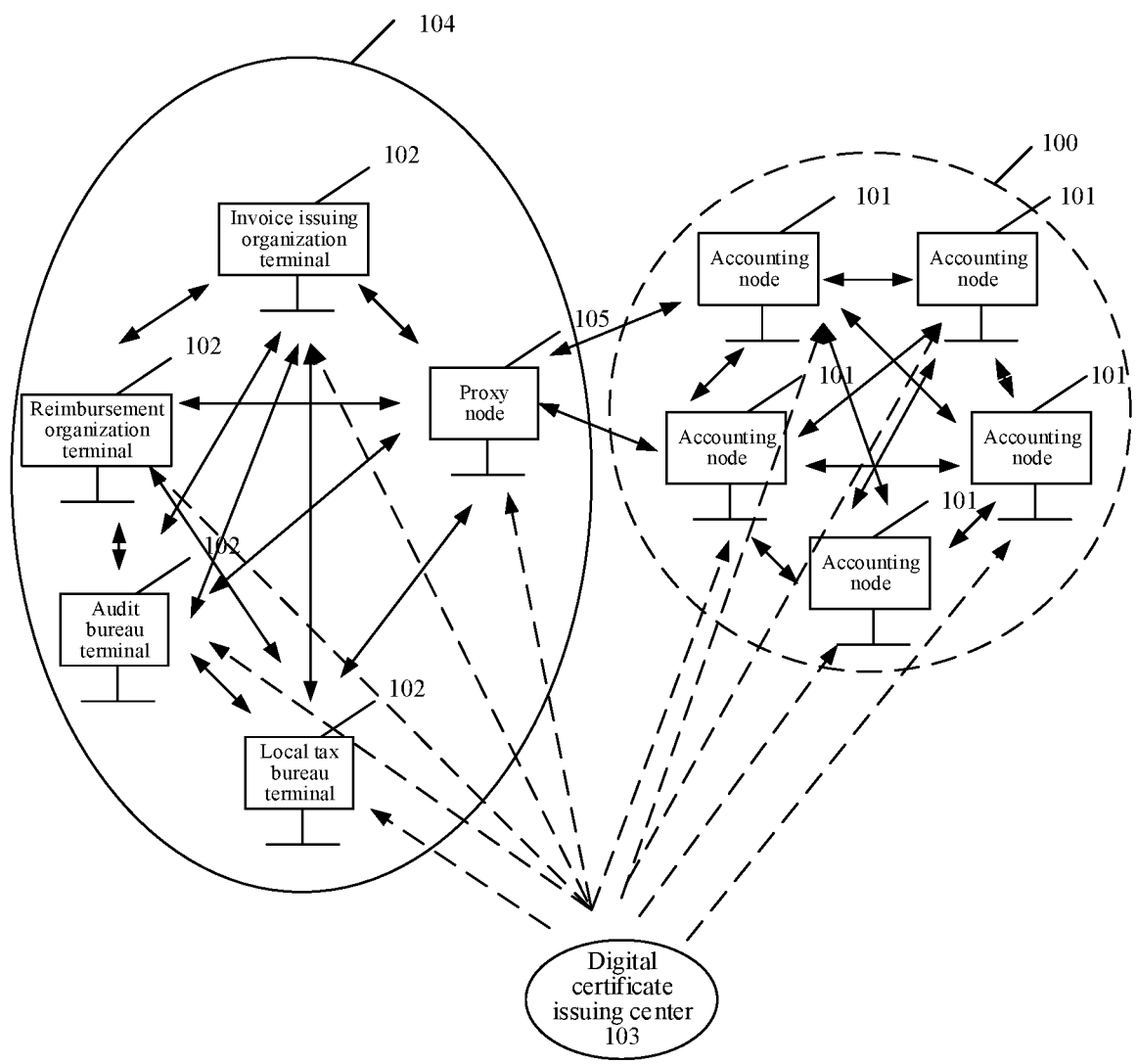
FIG. 2 is an architectural diagram of a scenario in which a method for issuing a digital certificate to a node in a blockchain network is applied to an electronic invoice application scenario according to an embodiment of this application.

FIG. 2 is an architectural diagram of a scenario in which a method for issuing a digital certificate to a node in a blockchain network is applied to an electronic invoice application scenario according to an embodiment of this application.

In a conventional method, service procedures such as electronic invoice issuance are all completed by using a centralized database. With the emergence of blockchain technologies, results of invoice linking have been achieved in specific application aspects. In the blockchain application scenario of the electronic invoice, transaction actions in a conventional centralized electronic invoice service procedure, for example, transaction actions such as a local tax bureau providing an invoice to an invoice issuing enterprise, the invoice issuing enterprise issuing an invoice to a person receiving the invoice, and the person receiving the invoice getting the invoice reimbursed from a reimbursement organization to which the person receiving the invoice belongs all need to be linked, that is, need to be recorded on a blockchain.

In events such as a local tax bureau providing an invoice to an invoice issuing organization and the invoice issuing organization issuing an invoice to a person receiving the invoice, service nodes 102 such as a local tax bureau terminal and an invoice issuing organization terminal transmit transaction information such as invoice providing and invoice issuing to an accounting node sub-network 100 for linking. After a leader accounting node performs linking, for example, as shown in FIG. 1B, in a process in which the leader accounting node transmits a block header to the service node 102, a private key of the leader accounting node needs to sign a block body. In a process in which the service node 102 queries transaction information in the block body, a private key of the service node 102 needs to sign a query request. The service node 102 and the proxy node 105 verify a signature by using a public key of the leader accounting node and a public key of the service node 102 respectively. Therefore, a digital certificate needs to be issued to ensure the validity of the public key and the private key, so that the method for issuing a digital certificate to a node in a blockchain network in this embodiment of this application is generated.

FIG. 3A to FIG. 3K are diagrams of a display interface of an invoice issuing terminal node in a case in which a method for issuing a digital certificate to a node in a blockchain network is applied to an electronic invoice application scenario according to an embodiment of this application. These diagrams of interfaces show a general process in which the transaction information generator node 102 outside the accounting node sub-network 100 in the system architecture shown in FIG. 1A in the electronic invoice application scenario applies for a digital certificate and links transaction information.

Figure 3A:
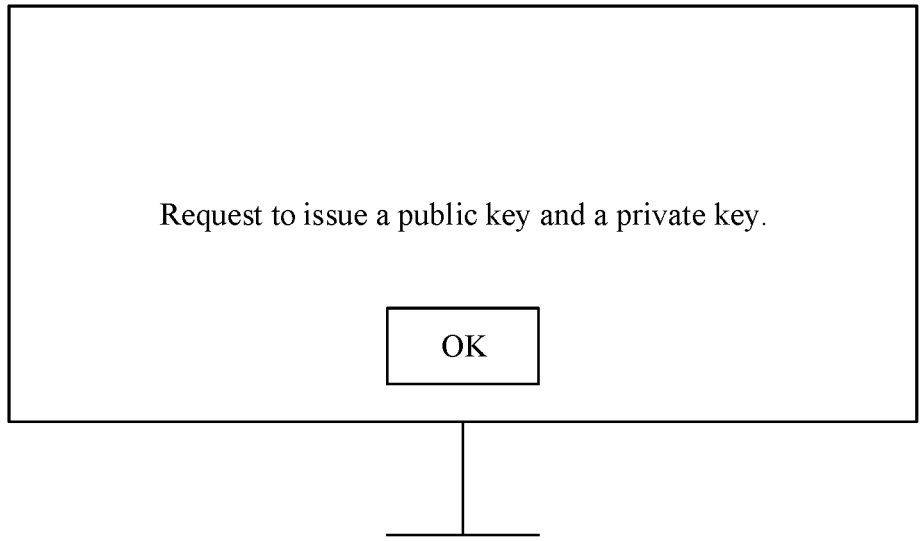

As shown in FIG. 3A, before performing an invoice issuing action, an invoice issuing organization terminal needs to sign transaction information in a process of transmitting the transaction information to the accounting node 101 for account keeping, so that the invoice issuing organization terminal needs to be provided with a public key and a private key first. Therefore, in the interface in FIG. 3A, a prompt "Request to issue a public key and a private key" is displayed, and when "OK" is clicked, the invoice issuing organization terminal requests the digital certificate issuing center 103 to issue a public key and a private key.

Figure 3B:
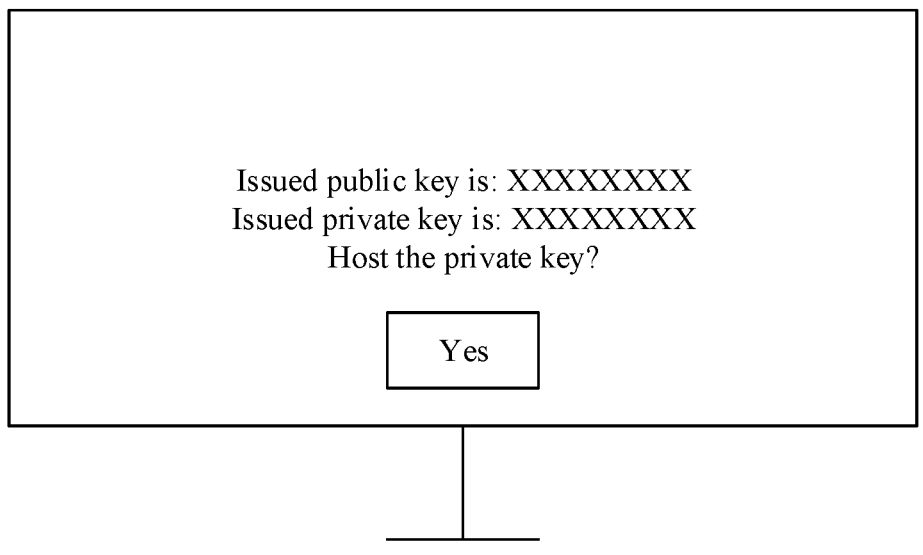

As shown in FIG. 3B, the digital certificate issuing center 103 generates a public-private key pair according to the request from the invoice issuing organization terminal, and returns the public-private key pair to the invoice issuing organization terminal. The invoice issuing organization terminal may choose to store the private key or may enable the private key to be hosted by the digital certificate issuing center, to prevent the private key stored on the invoice issuing organization terminal from being lost due to a terminal fault.

Figure 3C:
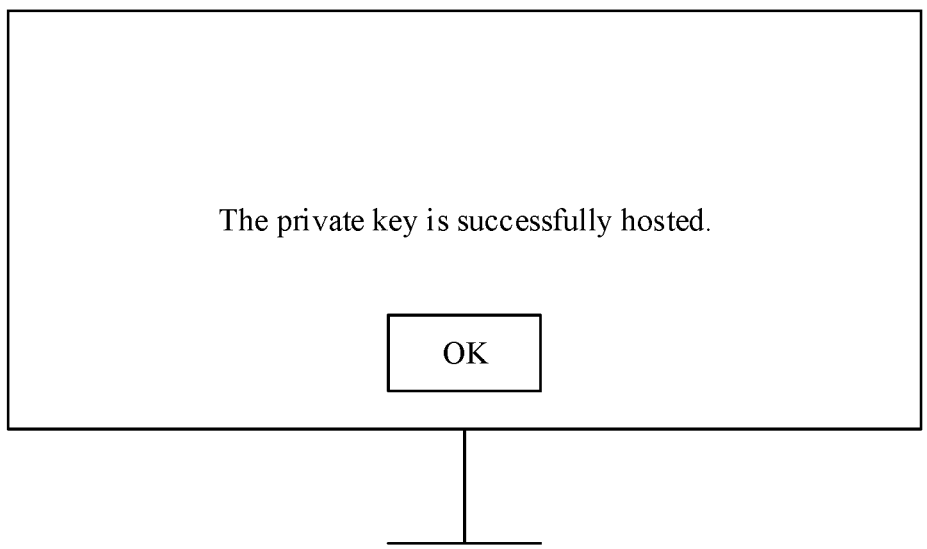

Therefore, when the public-private key pair is returned, as shown in the interface in FIG. 3B, a prompt "Does the private key need to be hosted" may be displayed. When it is chosen to host the private key, an administrator may click "Yes" shown in FIG. 3B, and the private key is hosted by the digital certificate issuing center 103. As shown in FIG. 3C, a prompt "The private key is successfully hosted" is displayed.

Figure 3D:
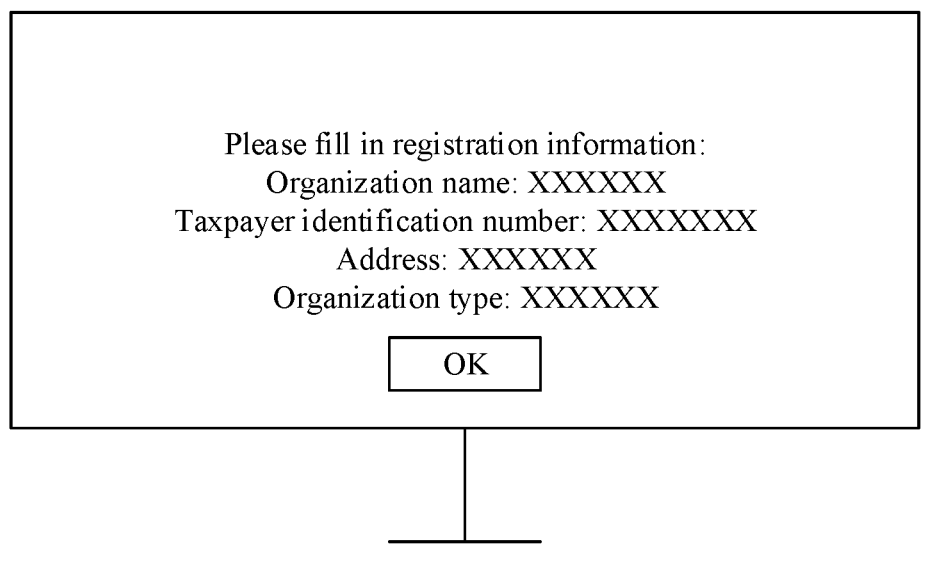

To prove that the public key and the private key are uniform public and private keys that are issued by a valid institution, it is necessary to apply for a digital certificate to prove the validity of the public key and the private key. As shown in FIG. 3D, registration information such as an organization name and a taxpayer identification number is written on the invoice issuing organization terminal. After the administrator clicks "OK", an issued public key and the registration information are submitted to the digital certificate issuing center 103.

After receiving the registration information, the digital certificate issuing center 103 authenticates the registration information, and issues a digital certificate to the invoice issuing organization terminal if the authentication succeeds. The digital certificate includes plaintext information such as a version number, a signature algorithm, a public key of an authentication module, and a public key of an invoice issuing organization and a signature formed on the plaintext information by using a private key of the authentication module, as shown in FIG. 3E. Because the digital certificate includes the public key of the invoice issuing organization and the public key of the invoice issuing organization has a binding relationship with the public key and the private key, it is proved that the issued public key and the issued private key are valid.

After the invoice issuing organization terminal receives the digital certificate, the administrator may click "Verify", so as to verify the signature in the digital certificate by using the public key of the authentication module. If the verification succeeds, it is proved that the digital certificate is issued by a valid institution, and a prompt that the verification on the digital certificate shown in FIG. 3F succeeds is displayed.

When issuing an invoice, the invoice issuing organization terminal needs to link invoice issuing information. In this case, transaction information such as the invoice issuing organization and an invoice identifier is written on the interface in FIG. 3G. The administrator clicks "Transmit the transaction information to an accounting node" to instruct to transmit the transaction information to a corresponding accounting node 101.

To ensure the validity of the transmitter of the transaction information and the integrity of the transmission of the transaction information, the transaction information needs to be signed. A private key of the invoice issuing organization terminal is required for the signing. Because it is chosen to host the private key on the interface in FIG. 3B, in this case, the hosted private key needs to be obtained from the digital certificate issuing center 103. The administrator chooses "Yes" on the interface in FIG. 3H.

Figure 3I:
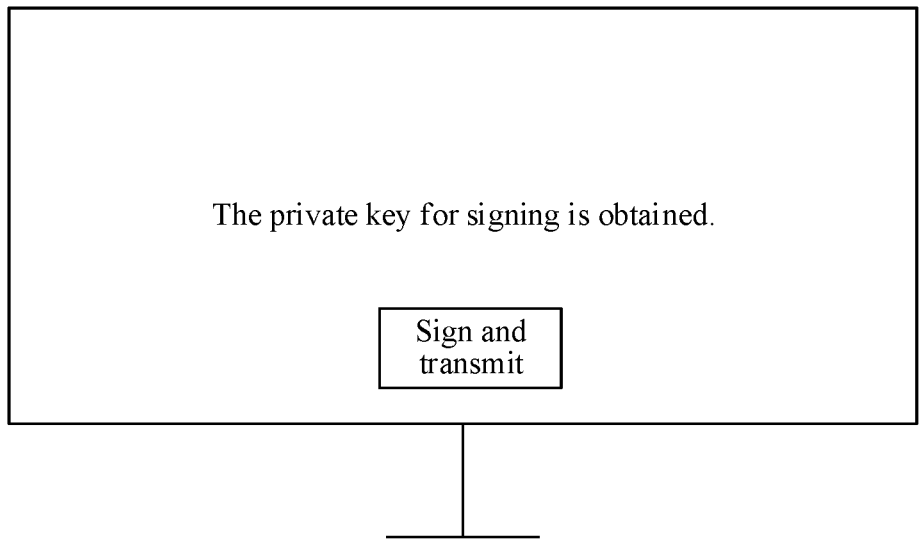
Figure 3J:
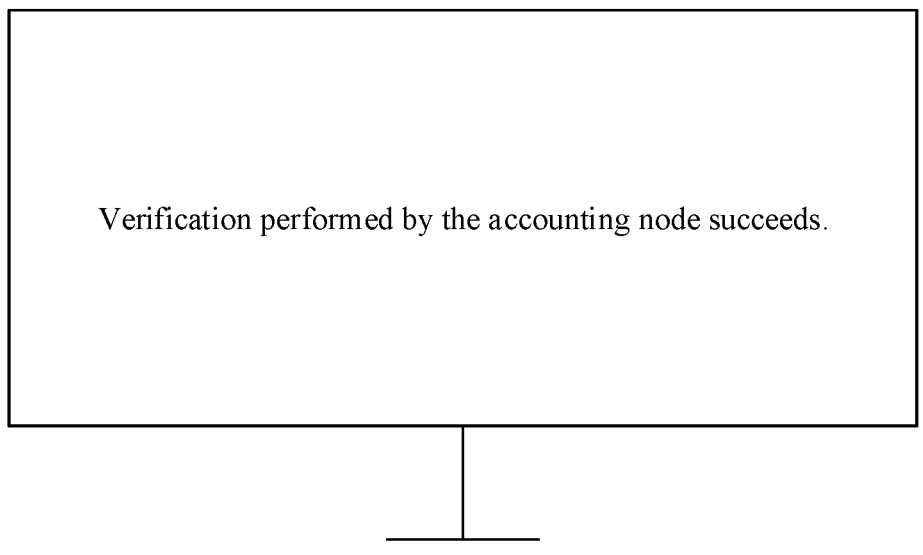

After the hosted private key is obtained from the digital certificate issuing center 103, a prompt interface shown in FIG. 3I is displayed. The administrator clicks "Sign and transmit" on the interface, to sign the transaction information by using the private key of the invoice issuing organization terminal, and transmit a signature to the accounting node 101.

After receiving the signature of the invoice issuing organization terminal, the accounting node 101 verifies the signature by using a public key of the invoice issuing organization terminal. After the verification succeeds, the invoice issuing organization terminal is notified that the verification succeeds. The invoice issuing organization terminal displays the interface shown in FIG. 3J.

The accounting node 101 links the transaction information. After the linking is completed, the invoice issuing organization terminal is notified that the linking is completed. The invoice issuing organization terminal displays the interface shown in FIG. 3K.

FIG. 4A to FIG. 4K are diagrams of a display interface of a node in a case in which a method for issuing a digital certificate to a node in a blockchain network is applied to an electronic invoice application scenario according to an embodiment of this application. These diagrams of interfaces show a general process in which a service node 102 in a service node sub-network 104 in the system architecture shown in FIG. 1B queries a block body of a linked data block from an accounting node 101 in an accounting node sub-network 100.

FIG. 4A to FIG. 4K show a process in which the service node 102 completes the obtaining of a public key and a private key and a corresponding digital certificate before querying transaction information in the block body. The process is similar to that shown in FIG. 3A to FIG. 3F. Therefore, details are not described herein again.

Figure 4B:
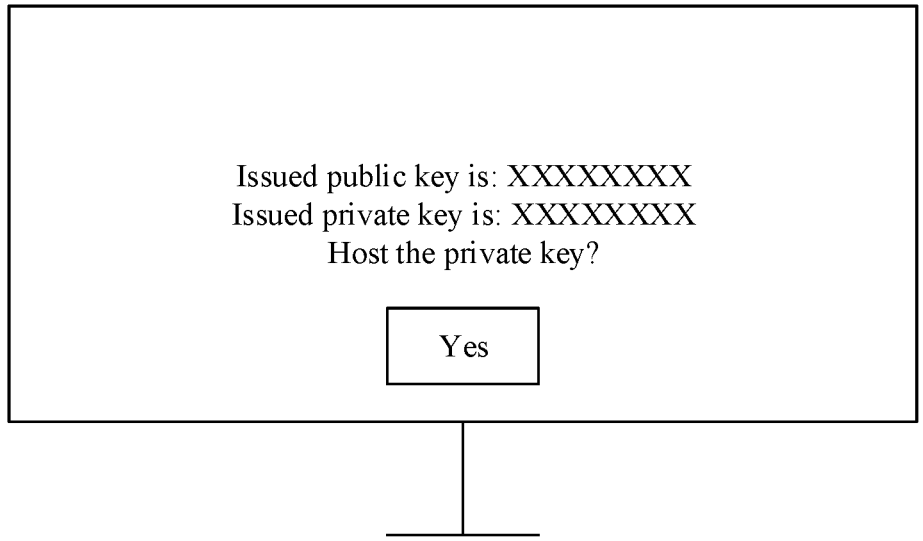
Figure 4C:
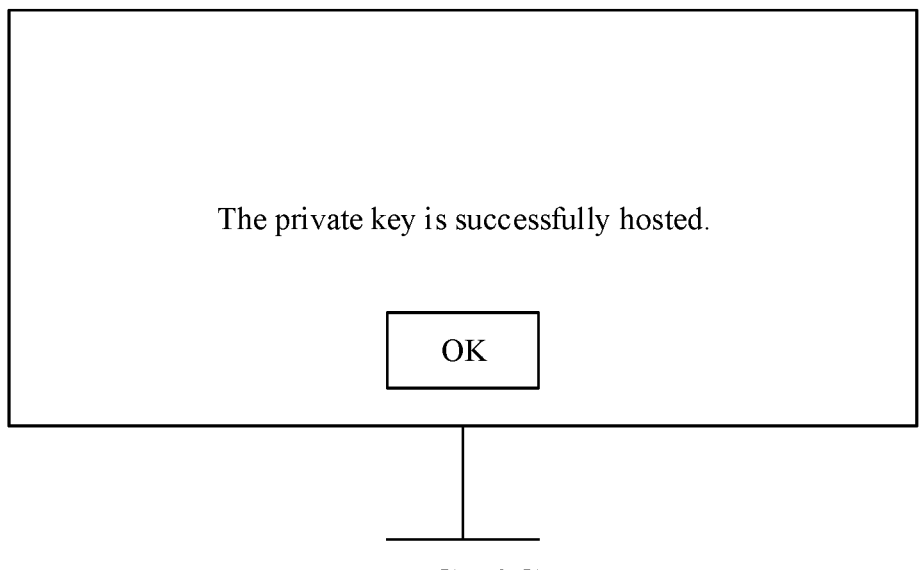
Figure 4D:
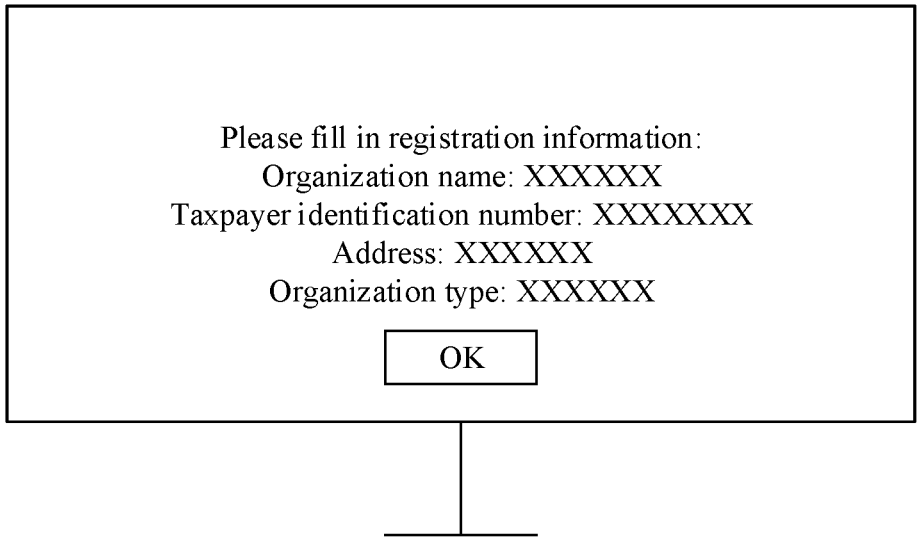
Figure 4E:
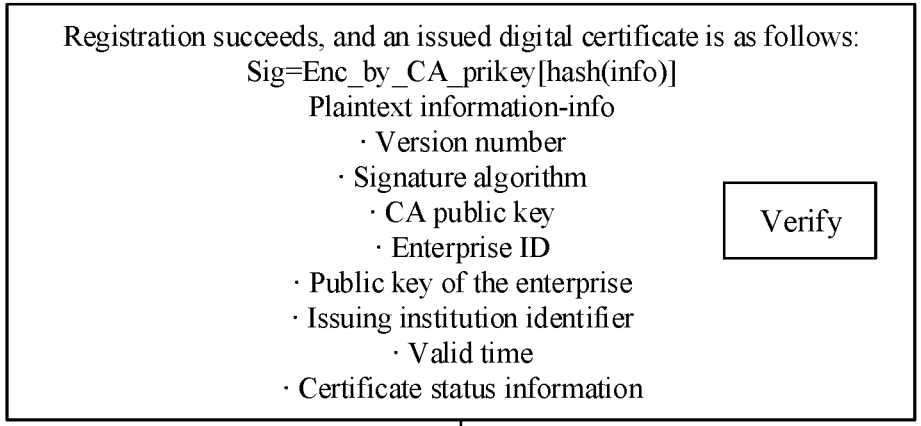
Figure 4F:
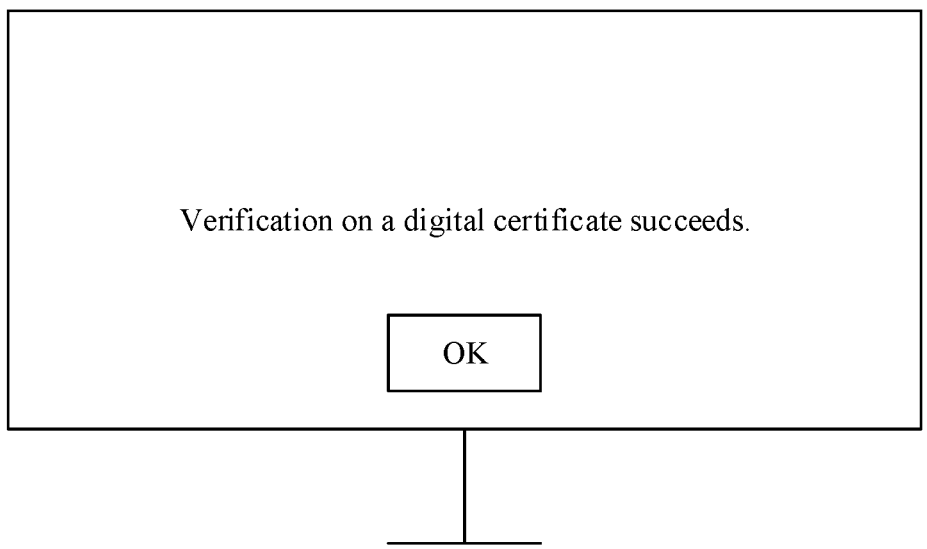
Figure 4G:
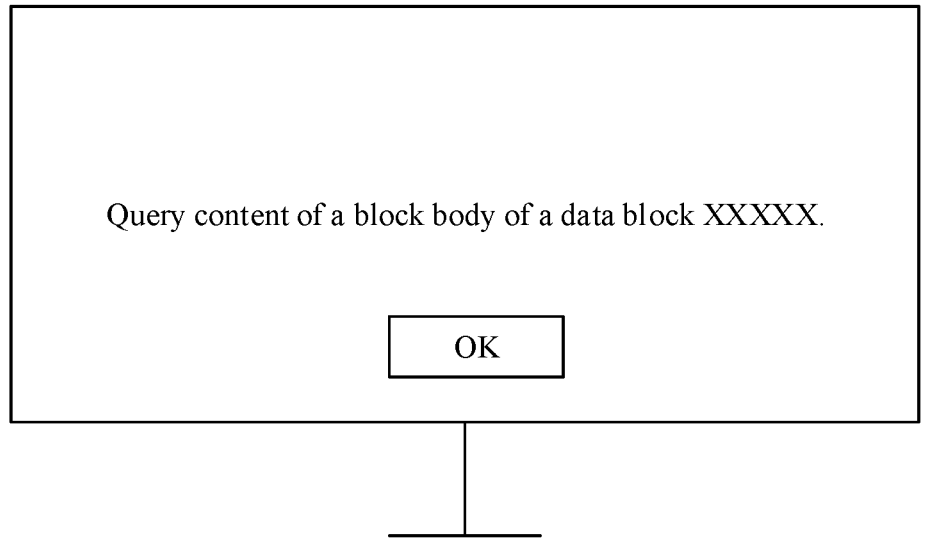

After the transaction information is linked, the service node 102 only receives a block header transmitted from the accounting node 101. When the service node 102 needs to query the transaction information in the block body, the interface shown in FIG. 4G is displayed. The administrator clicks "OK" to instruct to transmit a query request to the proxy node 105.

Figure 4H:
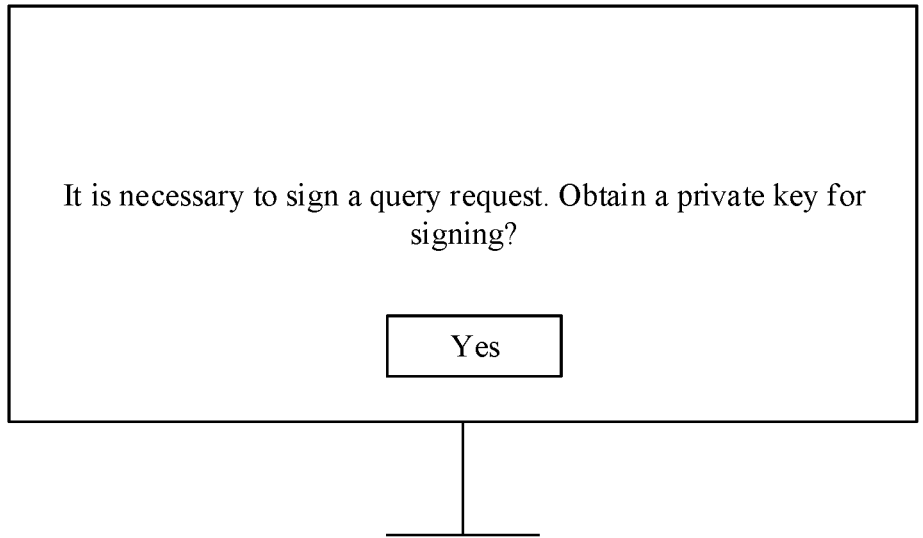

To prove that the query request is transmitted by a certified service node 102, a signature of the service node 102 needs to be transmitted at the same time. As shown in FIG. 4H, a display interface prompts that the query request needs to be signed, and asks whether to obtain a private key for signing.

Figure 4I:
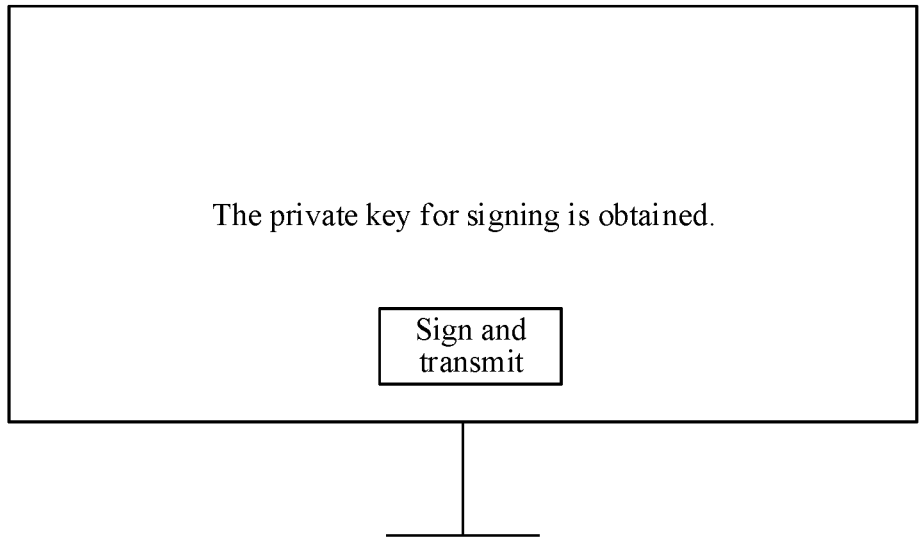
Figure 4J:
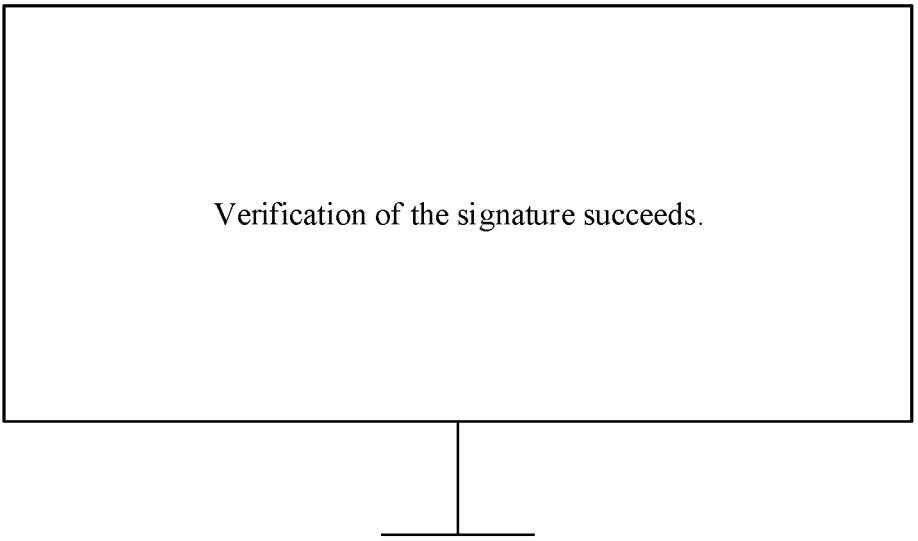

The administrator clicks "Yes" on the interface in FIG. 4H to obtain a private key of the service node 102 from a digital certificate issuing center 103. As shown in FIG. 4I, when the administrator clicks "Sign and transmit", the query request is signed by using the private key of the service node 102, and the signature and the query request are transmitted to the proxy node 105 together.

After receiving the query request and the signature, the proxy node 105 verifies the signature by using a public key of the service node 102, and if the verification succeeds, the proxy node notifies the service node 102 that the verification succeeds. The service node 102 displays the interface shown in FIG. 4J.

Figure 4K:
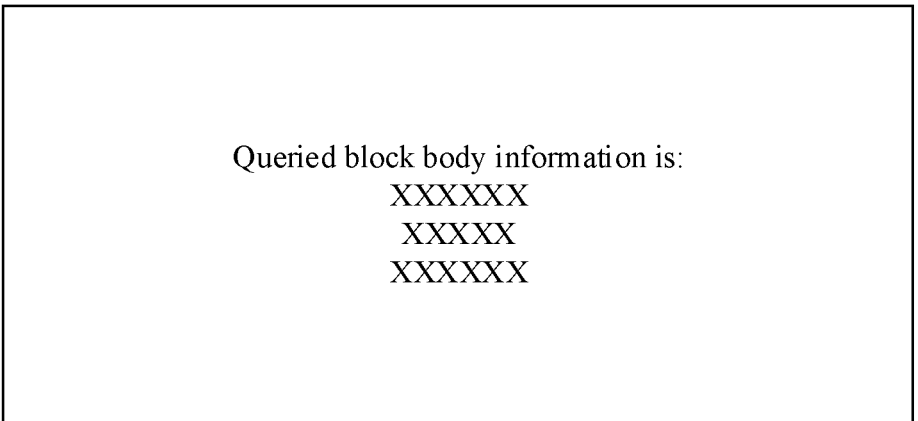

After the signature verification succeeds, the proxy node 105 transmits a query request for block header transaction information to the corresponding accounting node 101, and determines, according to a permission of the service node 102, whether to return the queried transaction information to the service node. FIG. 4K shows an interface on which the service node 102 views the returned transaction information.

Figure 5:
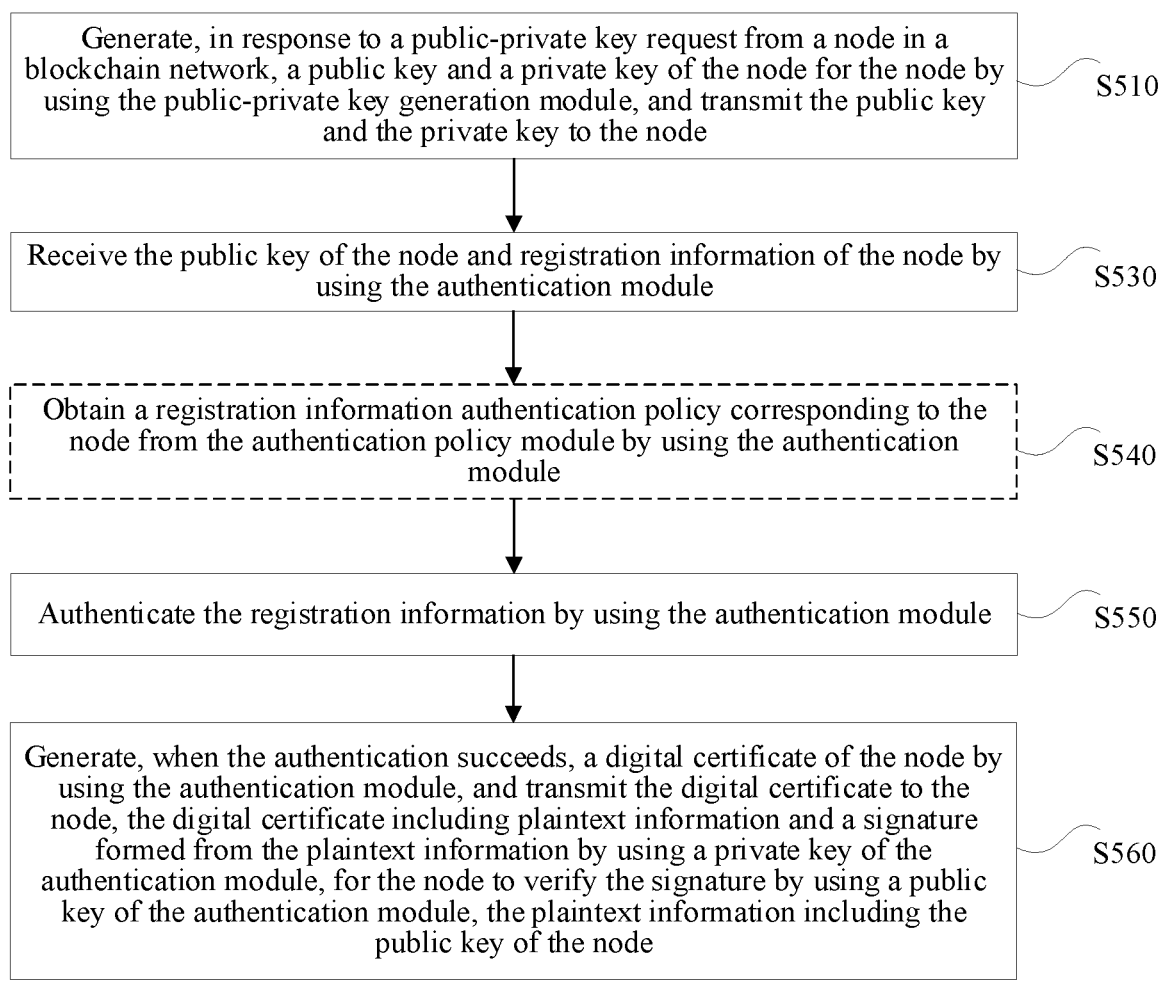
FIG. 5 is a flowchart of a method for issuing a digital certificate to a node in a blockchain network according to an embodiment of this application.

As shown in FIG. 5, according to an embodiment of this application, a method for issuing a digital certificate to a node in a blockchain network is provided.

The blockchain network is an entire system architecture involved in the recording of a data block on a blockchain as shown in FIG. 1A to FIG. 1C. The digital certificate is a certification document set for ensuring that a public key and a private key allocated to a node are allocated by a valid institution. Nodes in the blockchain network are all nodes other than a digital certificate issuing center 103 in the blockchain network. In FIG. 1A, the nodes include the transaction information generator nodes 102 and the accounting nodes 101. In FIG. 1B and FIG. 1C, the nodes include the service node 102, the proxy node 105, and the accounting nodes 101.

Figure 6:
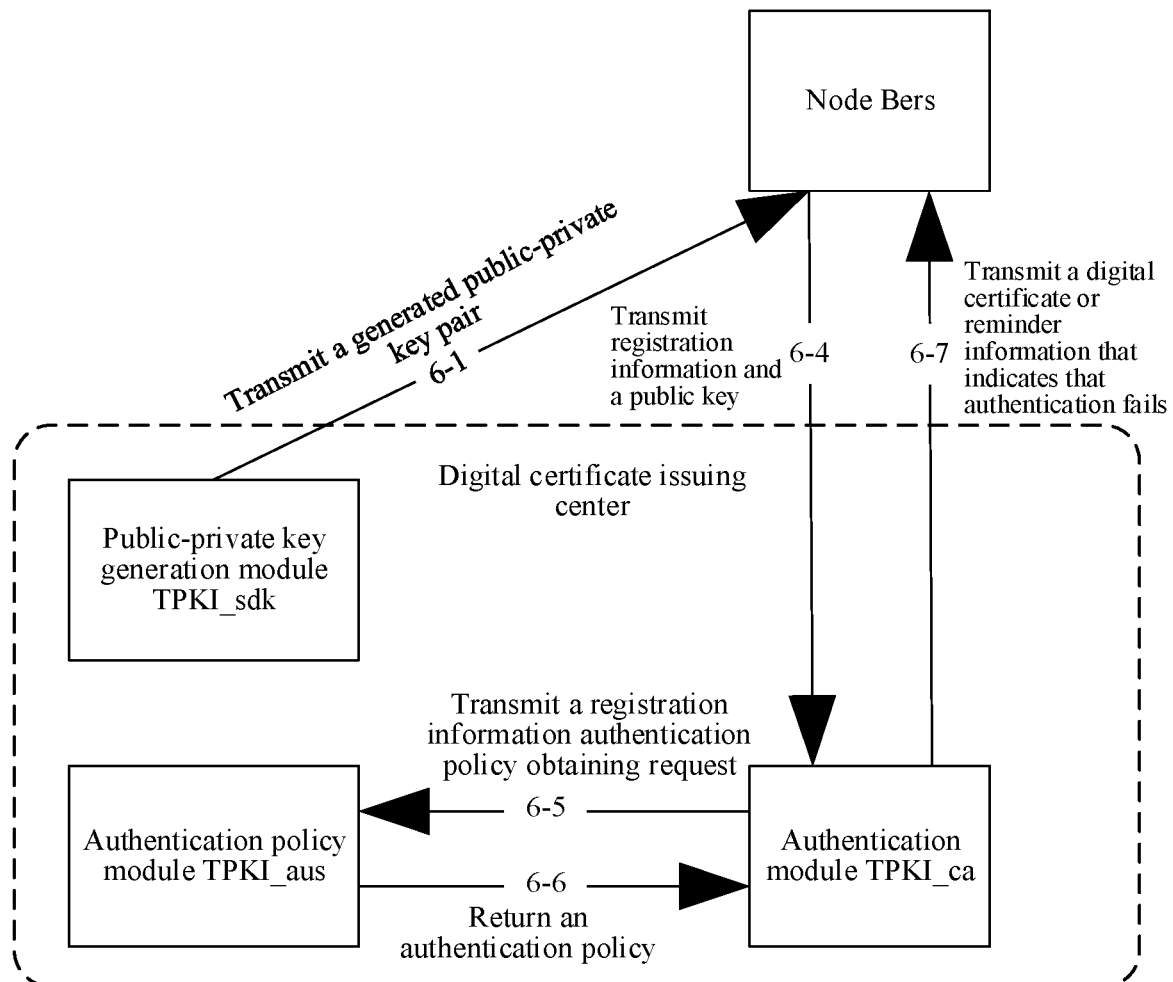
FIG. 6 is a schematic diagram of interactions between modules in a digital certificate issuing center and between the modules and a node according to an embodiment of this application.

The method is performed by the digital certificate issuing center 103. The digital certificate issuing center is a centralized infrastructure that provides a security service for communication between nodes of a blockchain based on an encryption algorithm, and can issue a digital certificate to a node to acknowledge the validity of the public key and the private key. As shown in FIG. 6, the digital certificate issuing center 103 at least includes a public-private key generation module TPKI_sdk and an authentication module TPKI_ca. The public-private key generation module TPKI_sdk is a module for generating a public key and a private key for a node. The authentication module TPKI_ca is a module that authenticates a node to verify the validity of the node and further forms an authenticated pair between the valid node and a public key and a private key that are generated for the node.

In some cases, the digital certificate issuing center 103 may further include an authentication policy module TPKI_aus. The authentication policy module TPKI_aus is a module storing a policy that is used to authenticate registration information of the node.

The public-private key generation module TPKI_sdk, the authentication module TPKI_ca, and the authentication policy module TPKI_aus may be physical, for example, distributed in different physical machines, or may be virtual, for example, different virtual modules distributed in one physical machine.

As shown in FIG. 5, the method includes the following steps:

Step 510: Generate, in response to a public-private key request from a node in a blockchain network, a public key and a private key of the node for the node by using the public-private key generation module TPKI_sdk, and transmit the public key and the private key to the node.

Step 530: Receive the public key of the node and registration information of the node by using the authentication module TPKI_ca.

Step 550: Authenticate the registration information by using the authentication module TPKI_ca.

Step 560: Generate, in accordance with a determination that the authentication succeeds, a digital certificate of the node by using the authentication module TPKI_ca, and transmit the digital certificate to the node, the digital certificate including plaintext information and a signature formed from the plaintext information by using a private key of the authentication module TPKI_ca, for the node to verify the signature by using a public key of the authentication module TPKI_ca, the plaintext information including the public key of the node.

The public key and the private key are a key pair (that is, one public key and one private key) obtained by using an algorithm. The public key is a public part in the key pair, and the private key is a non-public part in the key pair. Data encrypted by using a public key can only be decrypted by a corresponding private key, and data encrypted by using a private key can only be decrypted by a corresponding public key.

The public key of the node is generated by the public-private key generation module TPKI_sdk of the digital certificate issuing center 103, and is used for encrypting or decrypting data transmitted between nodes, and when the digital certificate issuing center 103 issues a digital certificate to the node, an association between the digital certificate and the public key of the node is established, so that the digital certificate can prove that the public key and the private key that are generated for the node are valid. The node may store the public key of the authentication module TPKI_ca, for the node to verify, by using the public key of the authentication module TPKI_ca when the digital certificate of the digital certificate issuing center 103 is obtained, signatures formed for the digital certificate and the public key of the node by using the private key of the authentication module TPKI_ca, to provide public credibility of the digital certificate.

It may be understood that the digital certificate issuing center 103 may further include the authentication policy module TPKI_aus. In this case, before step 550, the method may further include step 540 (the dashed line in FIG. 5 represents that the step is optional). To be specific, a registration information authentication policy corresponding to the node is obtained from the authentication policy module TPKI_aus by using the authentication module TPKI_ca, so that during the authentication of the registration information, that is, in step 550, the registration information may be authenticated based on the registration information authentication policy corresponding to the node by using the authentication module (TPKI_ca), so that the authentication has a uniform standard (referring to FIG. 5).

The technical solution shown in FIG. 5 is described below with reference to a schematic diagram of interactions between modules in a digital certificate issuing center and between the modules and a node shown in FIG. 6. In step 6-1, the public-private key generation module TPKI_sdk generates a public-private key pair for a node Bers and transmits the public-private key pair to the node. In step 6-4, the node Bers transmits registration information and a public key to the authentication module TPKI_ca. In step 6-5, the authentication module TPKI_ca transmits a registration information authentication policy obtaining request to the authentication policy module TPKI_aus. The authentication policy module TPKI_aus then obtains a registration information authentication policy corresponding to the node, and returns the authentication policy to the authentication module TPKI_ca in step 6-6. If the authentication succeeds, the authentication module TPKI_ca transmits a digital certificate to the node Bers in step 6-7. If the authentication fails, the authentication module TPKI_ca transmits, to the node Bers, reminder information that indicates that authentication fails in step 6-7.

Step 510 to step 560 are described below in detail.

Step 510: Generate, in response to a public-private key request from a node in a blockchain network, a public key and a private key of the node for the node by using the public-private key generation module TPKI_sdk, and transmit the public key and the private key to the node.

The public-private key request is a request used by the node in the blockchain network to obtain a digital certificate from a digital certificate issuing center. The public-private key request may be a network request based on various network protocols, for example, a request in the HyperText Transfer Protocol (HTTP)/HTTPS protocol or a request generated by using methods such as get and post.

In an embodiment, a public-private key pair may be generated by using a command-line tool of an existing secure socket layer cryptographic library OpenSSL.

For different asymmetric encryption algorithms, methods for generating a public-private key pair are different. Therefore, in an embodiment, an asymmetric encryption algorithm library is set in the public-private key generation module TPKI_sdk, and the public-private key generation module TPKI_sdk randomly selects an asymmetric encryption algorithm from the asymmetric encryption algorithm library, to generate the public key and the private key of the node for the node.

In an embodiment, the public-private key request transmitted by the node in the blockchain network to the digital certificate issuing center includes a name of the asymmetric encryption algorithm, and the public-private key generation module TPKI_sdk generates the public key and the private key of the node for the node according to the asymmetric encryption algorithm having the name. The benefit of the embodiment is that the flexibility of selecting a public key and a private key by the node is improved, so that the node may select a public key and a private key based on an encryption algorithm favored by the node.

In an embodiment, the public-private key request transmitted by the node in the blockchain network to the digital certificate issuing center includes the type of the node. A table of correspondence between the type of a node and the name of an asymmetric encryption algorithm is preset in the public-private key generation module TPKI_sdk, and the public-private key generation module TPKI_sdk searches the table of correspondence according to the type of the node in the public-private key request, to obtain a corresponding name of an asymmetric encryption algorithm, and generates the public key and the private key of the node for the node according to an asymmetric encryption algorithm having the name. The benefit of the embodiment is that, an asymmetric encryption algorithm suitable for a node of a type is usually fixed. An asymmetric encryption algorithm suitable for a node is selected according to the type of the node to generate a public key and a private key, thereby improving the quality of the generated public key and the generated private key.

In an embodiment, an asymmetric encryption algorithm library is set in the public-private key generation module TPKI_sdk, and asymmetric encryption algorithms in the asymmetric encryption algorithm library have a predetermined order. The public-private key generation module TPKI_sdk selects a next asymmetric encryption algorithm of a previous selected asymmetric encryption algorithm from the asymmetric encryption algorithm library in the predetermined order, to generate the public key and the private key of the node for the node; and if the previous selected asymmetric encryption algorithm is the last asymmetric encryption algorithm in the predetermined order, the first asymmetric encryption algorithm is selected, to generate the public key and the private key of the node for the node. An advantage of the embodiment is that, because a different asymmetric encryption algorithm is selected each time, the difficulty of cracking the public key and the private key by a third party during transmission is improved, thereby improving the transmission security of the issued public key and the issued private key.

In an embodiment, after the generating a public key and a private key of the node for the node by using the public-private key generation module TPKI_sdk, and transmitting the public key and the private key to the node, the method further includes: backing up and storing the public key and the private key of the node and a node identifier correspondingly. The benefit of this operation is that, if the node fails to adequately keep the private key of the node and does not delegate a private key management module TPKI_pks, the private key issued to the node may be found by using the public-private key generation module TPKI_sdk.

Step 530: Receive the public key of the node and registration information of the node by using the authentication module TPKI_ca.

As described above, the public key of the node has been generated by the public-private key generation module TPKI_sdk and is transmitted to the node.

The registration information may be information such as an organization name and a taxpayer identification number that needs to be filled when the node registers with the digital certificate issuing center 103. The significance for registering with the digital certificate issuing center 103 is used to obtain the digital certificate, so as to prove that the public key and the private key that are allocated to the node are a public key and a private key issued to the node by a valid institution. The digital certificate can be issued to the node only when the registration information is authenticated.

In an embodiment, the public key of the node and the registration information of the node are encrypted by using a public key of the authentication module TPKI_ca. The benefit of this operation is that, only the authentication module TPKI_ca has a private key of the authentication module TPKI_ca, and can decrypt the encrypted public key and the encrypted registration information. Once the public key and the registration information are intercepted by a third party during transmission, the third party does not have the private key of the authentication module TPKI_ca and cannot perform decryption, so that the transmission security of the registration information of the node is ensured.

Step 540: Obtain a registration information authentication policy corresponding to the node from the authentication policy module (TPKI_aus) by using the authentication module (TPKI_ca).

The registration information authentication policy is a policy on which security requirements that can be met by the digital certificate are based, and may be a policy of one or more security rules, for example, which pieces of registration information are to be verified and what standard is to be used to perform verification. For example, the registration information authentication policy may be that an organization address is Shenzhen city and the population of the organization is greater than 500. That is, the blockchain network may be a blockchain network that serves a large- or medium-sized organization in Shenzhen city. In the case of an organization that is not in Shenzhen city or a small organization having a relatively small population in Shenzhen city, in consideration of network maintenance costs, the authentication of the organization may fail and no digital certificate is issued to the organization, and no validity proof is provided for a public key and a private key of the organization.

The registration information authentication policy corresponding to the node does not mean that the registration information authentication policy uniquely corresponds to the node. That is, the registration information authentication policy may be used for the node or may be used for nodes other than the node. The registration information authentication policy may be a unique registration information authentication policy that is universal to all nodes or may be a registration information authentication policy that varies from node to node.

In an embodiment, the registration information authentication policy corresponding to the node includes a registration information authentication policy specific to the type of the node; the registration information includes the type of the node; and step 540 includes: obtaining the registration information authentication policy specific to the type of the node from the authentication policy module (TPKI_aus).

In other words, the registration information authentication policy specific to the type of the node is determined according to the type of the node (for example, a financial enterprise terminal or a legal services corporation terminal) included in the registration information. Registration information authentication policies of different types of nodes may be different. For example, a financial enterprise may have a relatively high degree of profitability, and a registered capital needs to be more than 2 million yuan. A legal services corporation may have a relatively low degree of profitability, and a registered capital needs to be more than 100 thousand yuan.

The benefit of the embodiment is that nodes of a type have similar features, and similar standards are usually followed to determine whether a digital certificate can be issued to the nodes. In this way, the accuracy of the authentication is further improved.

In an embodiment, the registration information of the node includes a specification of the digital certificate that needs to be applied for, and the specification may represent a security level of the digital certificate. The authentication policy module TPKI_aus includes a table of correspondence between the specification of a digital certificate and an authentication policy of registration information, so that the registration information authentication policy corresponding to the node is found from the table of correspondence between the specification of a digital certificate and an authentication policy according to the specification of the digital certificate in the registration information.

The specification represents the security level of the digital certificate. For example, a specification of level 3 represents that the security level is the highest, a specification of level 2 represents that the security level is middle, and a specification of level 1 represents that the security level is the lowest. A higher security level indicates higher strictness of authentication, and there may be more corresponding authentication policies or authentication policies are more rigorous. The benefit of the embodiment is that, different authentication policies are set for digital certificates having different security levels, and the digital certificates having different security levels have different probative value for the validity of the public key and the private key. In this way, the flexibility of issuing the digital certificate can be improved.

In an embodiment, the registration information authentication policy is obtained in an intelligent protocol that is stored on a blockchain and signed by the node with an operator of the blockchain network. The node needs to sign the intelligent protocol with the operator of the blockchain network before using the blockchain network. The intelligent protocol has the registration information authentication policy used during authentication. The intelligent protocol and the identifier of the node may be correspondingly stored on the blockchain. In this way, the identifier of the node may be found from block bodies of all linked data blocks, and the intelligent protocol that is correspondingly stored with the identifier of the node is found. The registration information authentication policy is found from the intelligent protocol. The benefit of the embodiment is that an authentication policy in the intelligent protocol can be directly used without additionally setting an authentication policy, thereby improving the efficiency of issuing digital certificates.

In an embodiment, the authentication policy module TPKI_aus includes a table of correspondence between a requested issuance time period and an authentication policy. Step 540 includes:

determining a requested issuance time period within which the time at which the public key and the registration information are received falls; and transmitting the requested issuance time period to the authentication policy module TPKI_aus, for the authentication policy module TPKI_aus to search the table of correspondence between a requested issuance time period and an authentication policy, to obtain an authentication policy corresponding to the requested issuance time period and return the authentication policy.

For example, registration information authentication policies corresponding to an on-duty period of 9:00 to 17:00 and an off-duty time of 0:00 to 9:00 or 17:00 to 24:00 each day are different. The time at which the public key and the registration information are received may be determined as a requested issuance time of the digital certificate. An authentication policies varies when the requested issuance time falls within 9:00 to 17:00 or falls within 0:00 to 9:00 or 17:00 to 24:00. The authentication policy corresponding to the requested issuance time period may be found from the table of correspondence between a requested issuance time period and an authentication policy and used as an obtained registration information authentication policy.

The benefit of the embodiment is that changes of the authentication policy along with different time periods in some scenarios are fully considered, so that a digital certificate issuing system is applied more widely.

If the registration information authentication policy is obtained from the authentication policy module TPKI_aus, in step 550, the registration information is authenticated based on the registration information authentication policy corresponding to the node by using the authentication module (TPKI_ca).

The registration information authentication policy corresponding to the node may include a plurality of security rules, for example, an organization address being Shenzhen city and the population of the organization being greater than 500 that are described above. During the authentication, for the security rules, whether authentication information conforms to each security rule needs to be separately considered. If the authentication information conforms to all the security rules, the authentication succeeds, or otherwise, the authentication fails.

Step 560: Generate, in accordance with a determination that the authentication succeeds, a digital certificate of the node by using the authentication module TPKI_ca, and transmit the digital certificate to the node, the digital certificate including plaintext information and a signature formed from the plaintext information by using a private key of the authentication module TPKI_ca, for the node to verify the signature by using a public key of the authentication module TPKI_ca, the plaintext information including the public key of the node.

In an embodiment, the generating a digital certificate of the node includes:

generating plaintext information, the plaintext information including the public key of the node;

generating a digest for the plaintext information according to a predetermined digest algorithm;

encrypting the digest by using the private key of the authentication module TPKI_ca, to obtain the signature; and generating the digital certificate based on the signature and the plaintext information.

The predetermined digest algorithm may be, for example, a hash algorithm. Similar to a general signature generation process, in this embodiment, the digest is first generated for the plaintext information, and the digest is then encrypted, to obtain the signature. Subsequently, the signature and the plaintext information are put into the digital certificate together. Because the plaintext information has the public key of the node, an association between the digital certificate and the issued public key and the issued private key is established, so that the digital certificate can prove that a specific public key and a specific private key are issued validly. The function of the signature is to make it convenient for the node to verify that the digital certificate is issued by a valid institution, that is, the authentication module TPKI_ca, thereby improving the public credibility of the digital certificate.

Correspondingly, in an embodiment, the verifying the signature by using a public key of the authentication module TPKI_ca includes:

decrypting the signature in the digital certificate by using the public key of the authentication module TPKI_ca;

generating the digest for the plaintext information in the digital certificate by using the predetermined digest algorithm; and comparing a decryption result with the generated digest, where if they are consistent, the verification succeeds, and if they are not consistent, the verification fails.

In an embodiment, the public key of the authentication module TPKI_ca is stored in each node of the blockchain network. The public key of the authentication module TPKI_ca may be obtained from the public key stored in the node. An advantage of the embodiment is convenient and easy operation, thereby reducing the time for obtaining the public key of the authentication module TPKI_ca.

In an embodiment, the public key of the authentication module TPKI_ca may be obtained from a data block that is on the blockchain and records the public key of the authentication module TPKI_ca. In other words, the public key of the authentication module TPKI_ca is linked and stored, for example, is correspondingly stored in one piece of transaction information of a data block with an identifier of the authentication module TPKI_ca. During a query, transaction information of all data blocks on the blockchain is searched for the identifier of the authentication module TPKI_ca, and a public key, corresponding to the identifier, in the transaction information is found. An advantage of the embodiment is that storage space occupied in each node is reduced.

If the digital certificate is issued by a valid authentication module TPKI_ca, the decryption result and the generated digest shall be consistent, and the verification succeeds. If the verification fails, it is highly likely that the digital certificate is not issued by a valid authentication module TPKI_ca. In this way, the security of the digital certificate is improved.

In an embodiment, in addition to the signature verification described above, the node also performs issuing institution validity verification.

Figure 17A:
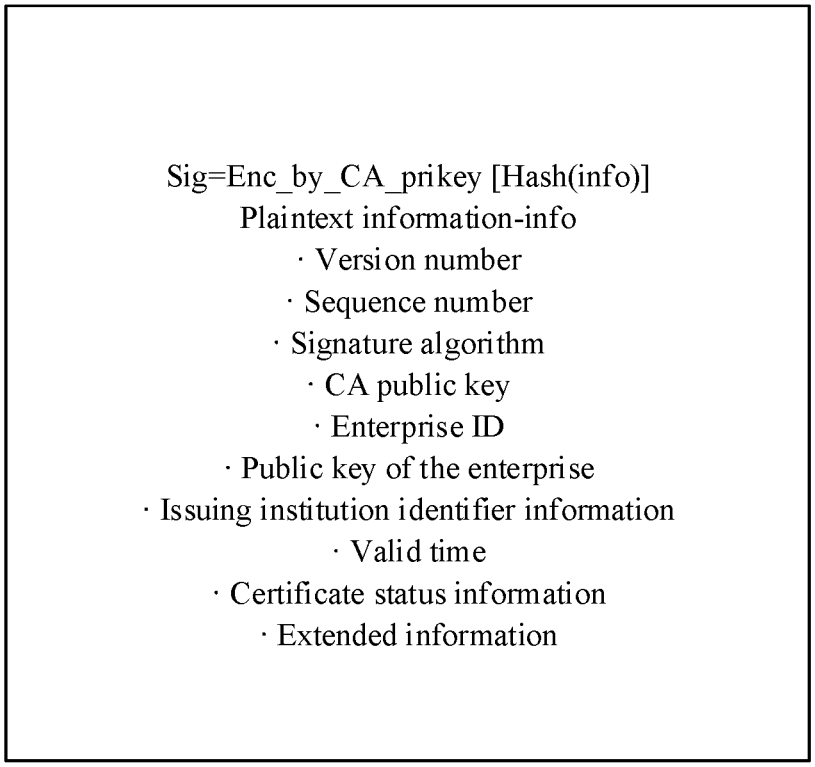
FIG. 17A and FIG. 17B are schematic diagrams of digital certificates issued by a digital certificate issuing center according to an embodiment of this application.
Figure 17B:
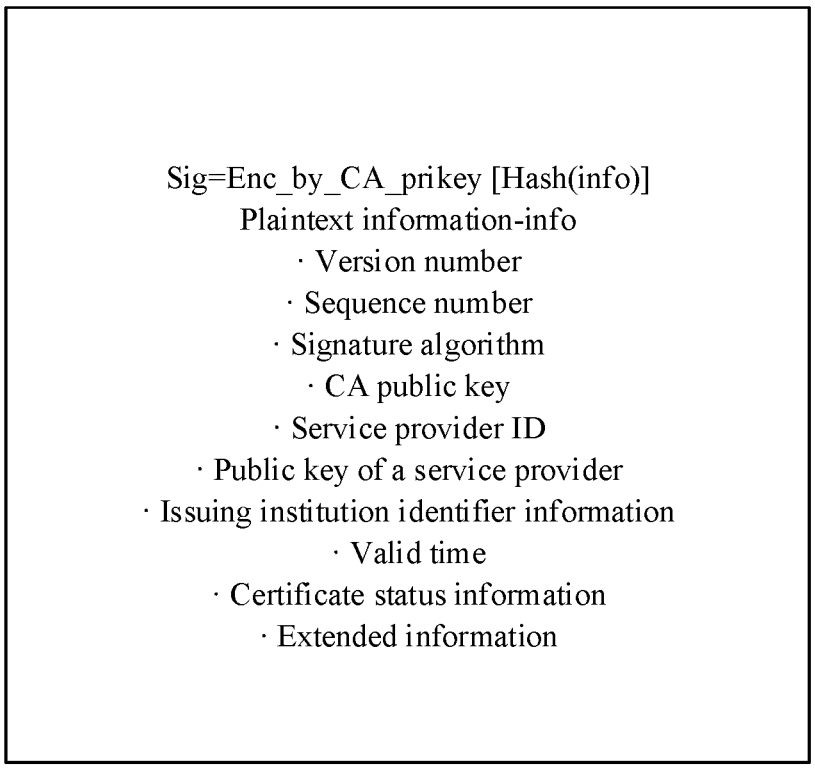

As shown in FIG. 17A and FIG. 17B, the plaintext information further includes issuing institution identifier information, for the node to verify the digital certificate according to a valid issuing institution identifier information list.

At each node, the valid issuing institution identifier information list may be stored, and the valid issuing institution identifier information list lists identifiers of all valid issuing institutions. Provided that identifier information of an issuing institution is present in the valid issuing institution identifier information list, the issuing institution is valid. By comparing the issuing institution identifier information in the plaintext information with each piece of valid issuing institution identifier information in the valid issuing institution identifier information list one by one, it may be determined whether the digital certificate is issued by a valid institution. The benefit of the issuing institution validity verification is that the public credibility of the digital certificate is further improved.

FIG. 17A and FIG. 17B are respectively examples of the content of the digital certificate issued by the digital certificate issuing center for the node when the node is an enterprise and a service provider. As shown in FIG. 17A and FIG. 17B, both the digital certificate of the enterprise and the digital certificate of the service provider include plaintext information and a signature for the plaintext information.

As shown in FIG. 17A, in addition to a public key of the enterprise and an issuing institution identifier, the plaintext information of the enterprise may further include a version number, a sequence number, a signature algorithm, the public key of the authentication module TPKI_ca, an enterprise identifier, a valid time, certificate status information, and extended information. It is to be understood by a person skilled in the art that, in practice, the plaintext information of the enterprise may only include one or more of the version number, the sequence number, the signature algorithm, the public key of the authentication module TPKI_ca, the enterprise identifier, the valid time, the certificate status information, and the extended information or may include none of them.

The version number is a version identifier of a blockchain. During the upgrade of the version of the blockchain, the version identifier in the digital certificate issued by the digital certificate issuing center changes.

The sequence number is a serial number of the issued digital certificate. Each digital certificate has a unique sequence number according to an issuing order. The sequence numbers may be generated according to the issuing order in ascending order.

The signature algorithm is the digest algorithm required for generating the digest for the plaintext information when the authentication module TPKI_ca generates a signature. The digest algorithm is returned to the node for that when verifying the signature, the node may use the digest algorithm to generate a digest for the plaintext information again, so as to compare the digest with the decryption result of the signature.

The significance for the public key of the authentication module TPKI_ca to be transmitted back to the node lies in that when the node decrypts the signature, the public key of the authentication module TPKI_ca needs to be used for the decryption.

The enterprise identifier is a unique mark for distinguishing the enterprise from others. A taxpayer identification number or the like may be used as the enterprise identifier or a dedicated identifier may be allocated to the enterprise.

The valid time is an expiry time before which the digital certificate is valid. Valid time verification that needs to be performed according to the valid time is mentioned below in the case of querying a private key, to determine whether to return the queried private key to the node.

The certificate status information is information representing the status of the digital certificate, for example, whether the certificate is revoked. If the certificate is not revoked, the certificate status information is normal.

The extended information is other information that needs to be added to the digital certificate according to an actual requirement.

A difference between FIG. 17A and FIG. 17B lies in that: in FIG. 17B, a service provider identifier is used in place of the enterprise identifier, and a public key of the service provider is used in place of the public key of the enterprise. The service provider identifier is a unique mark for distinguishing the service provider from others. The public key of the service provider is a public key allocated to the service provider.

The digital certificate may be a structured data file, and the structured data file may be in various formats that can be identified by the node, for example, the .cer format or the .crt format.

Figure 7:
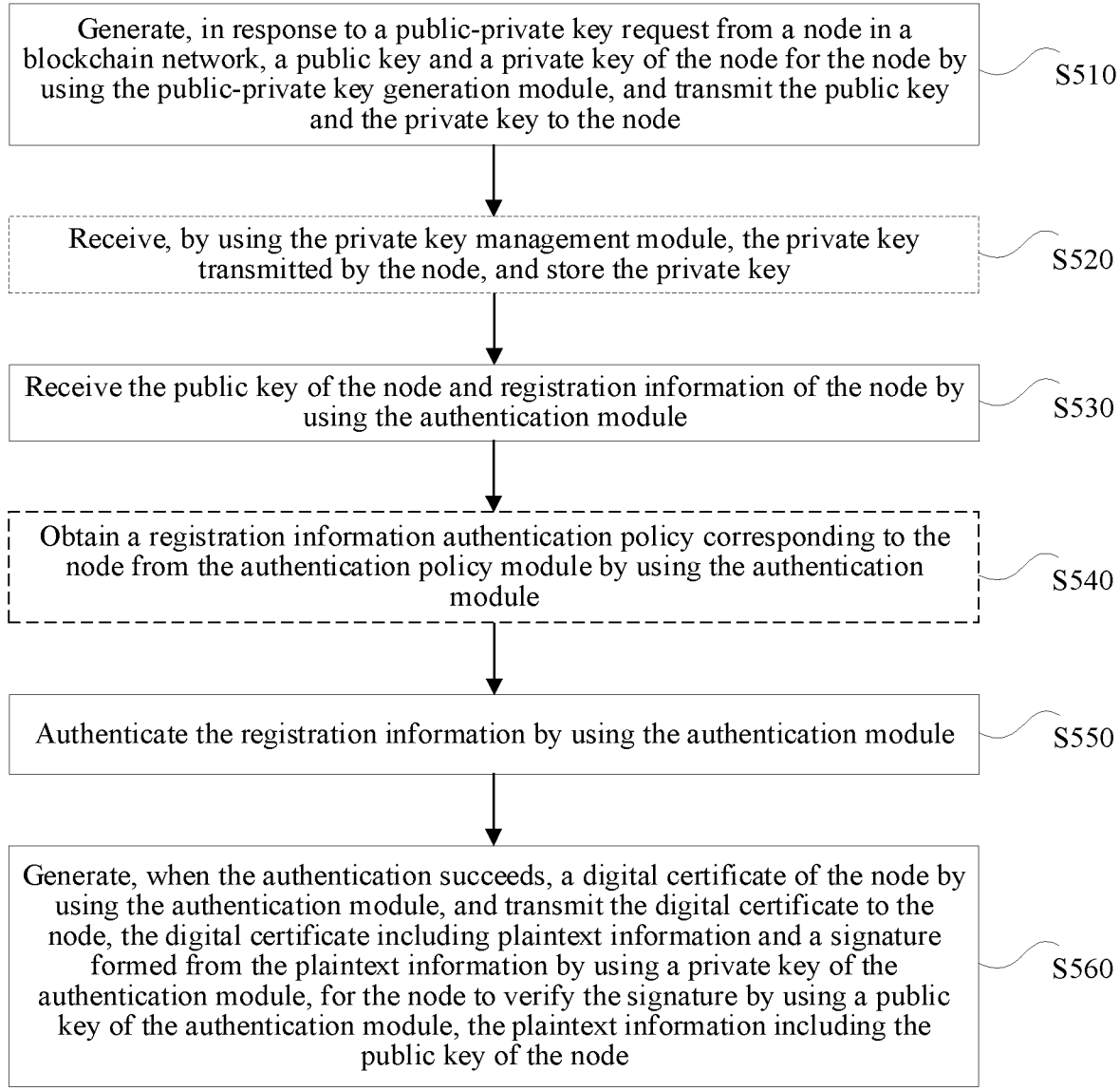
FIG. 7 is a flowchart of a method for issuing a digital certificate to a node in a blockchain network according to an embodiment of this application.

In an embodiment, the digital certificate issuing center further includes a private key management module TPKI_pks. The private key management module is a module hosting the private key issued to the node by the digital certificate issuing center. As shown in FIG. 7, after step 510, the method further includes the following steps:

Step 520: Receive, by using the private key management module TPKI_pks, the private key transmitted by the node, and store the private key.

The benefit of the embodiment is that when the node stores the private key, if a memory is damaged due to a fault in a machine, the private key is likely to be lost, and the private key is stored in the memory of the node and is prone to theft by a third party. These problems do not exist in the case of hosting.

Figure 8:
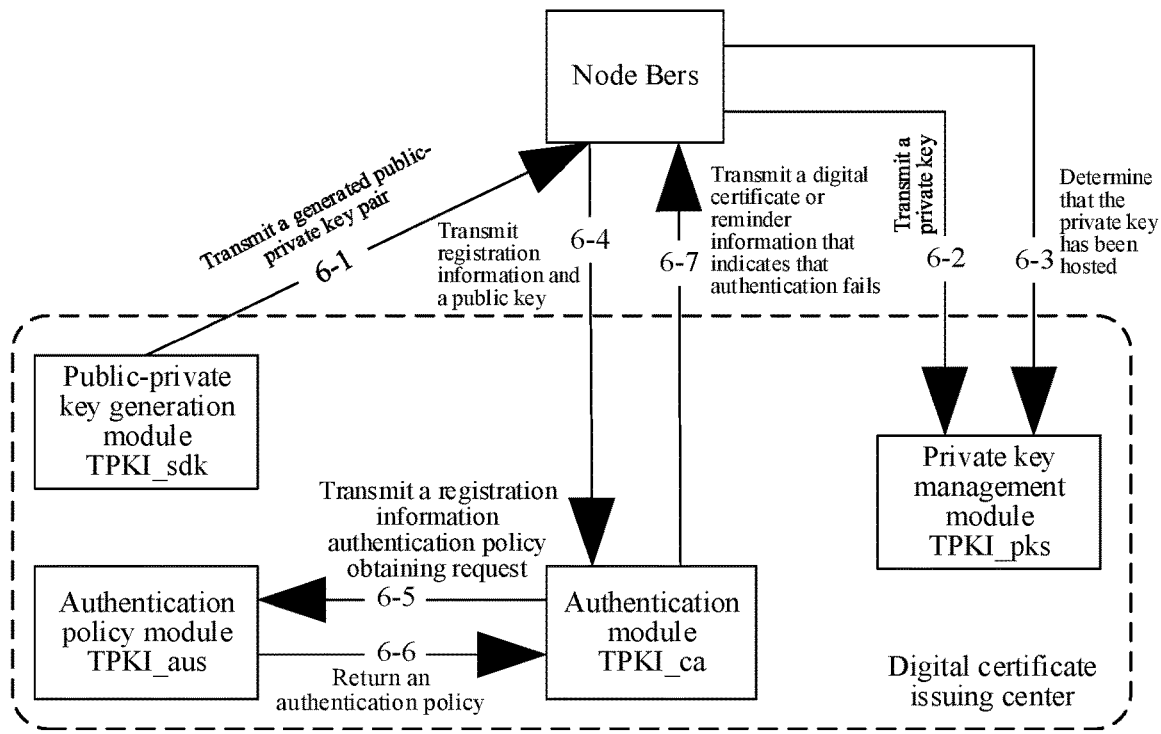
FIG. 8 is a schematic diagram of interactions between modules in a digital certificate issuing center and between the modules and a node according to an embodiment of this application.

Referring to FIG. 8, the private key management module TPKI_pks may implement bidirectional interaction with a node Bers by using step 6-2 and step 6-3. In step 6-2, the node transmits the private key to the private key management module TPKI_pks. In step 6-3, the private key management module TPKI_pks acknowledges to the node that the private key has been hosted.

Figure 9:
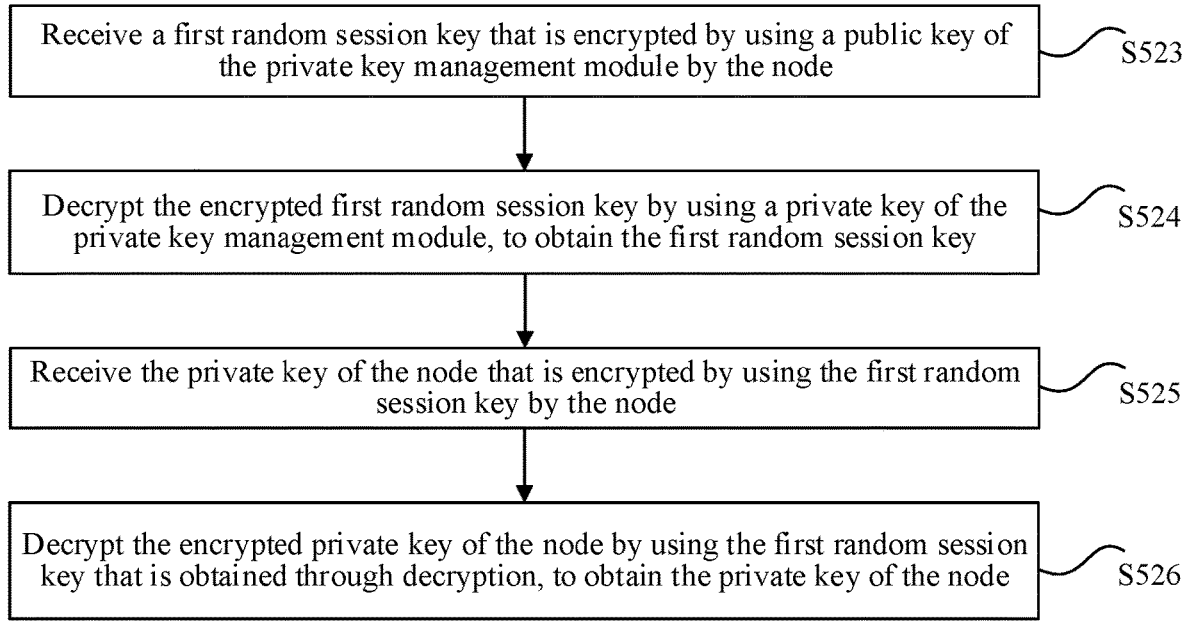
FIG. 9 is a flowchart of a method for receiving a private key transmitted by a node according to an embodiment of this application.

In an embodiment, as shown in FIG. 9, in step 520, the receiving the private key transmitted by the node includes the following steps:

Step 523: Receive a first random session key that is encrypted by using a public key of the private key management module TPKI_pks by the node.

Step 524: Decrypt the encrypted first random session key by using a private key of the private key management module TPKI_pks, to obtain the first random session key.

Step 525: Receive the private key of the node that is encrypted by using the first random session key by the node.

Step 526: Decrypt the encrypted private key of the node by using the first random session key that is obtained through decryption, to obtain the private key of the node.

Several foregoing steps shown in FIG. 9 are described below in detail.

In step 523, the first random session key that is encrypted by using a public key of the private key management module TPKI_pks by the node is received.

The first random session key is a session key randomly generated when the node needs to enable the private key to be hosted.

In an embodiment, all nodes in the blockchain network store the public key of the private key management module TPKI_pks. In this case, the node may obtain the public key of the private key management module TPKI_pks from the stored public key. An advantage of the embodiment is convenient and easy operation, thereby reducing the time for obtaining the public key of the private key management module TPKI_pks.

In an embodiment, the public key of the private key management module TPKI_pks is stored on the blockchain, and the node may obtain the public key of the private key management module TPKI_pks from a data block that is on the blockchain and records the public key of the private key management module TPKI_pks. In other words, the public key of the private key management module TPKI_pks is linked and stored, and may be correspondingly stored in a data block with an identifier of the private key management module TPKI_pks. When the public key of the private key management module TPKI_pks is obtained from the blockchain, all data blocks having the identifier of the private key management module TPKI_pks may be found, and a public key that is correspondingly stored in one piece of transaction information with the identifier is found. An advantage of the embodiment is that storage space of each node is saved.

In step 524, the encrypted first random session key is decrypted by using a private key of the private key management module TPKI_pks, to obtain the first random session key.

Because only the private key management module TPKI_pks has the private key of the private key management module TPKI_pks, only the private key management module TPKI_pks can decrypt the encrypted first random session key. Therefore, even if a third party intercepts the encrypted first random session key, the third party cannot crack the first random session key, thereby ensuring the transmission security of the first random session key.

In step 525, the private key of the node that is encrypted by using the first random session key by the node is received.

As described above, even if the third party intercepts the encrypted first random session key, the third party cannot crack the first random session key, and only the node and the private key management module TPKI_pks have the first random session key. Therefore, after the private key of the node is encrypted by using the first random session key, the encrypted private key is transmitted to the private key management module TPKI_pks, and even if the third party intercepts the encrypted private key of the node during transmission, the third party cannot crack the encrypted private key, thereby improving the transmission security of the private key of the node.

In step 526, the encrypted private key of the node is decrypted by using the first random session key that is obtained through decryption, to obtain the private key of the node.

The benefit of the embodiment is that two negotiation processes are used in the transmission process of the private key of the node. In the first negotiation process, the first random session key is transmitted, and the first random session key is encrypted by using the public key of the private key management module TPKI_pks during transmission. After receiving the encrypted first random session key, the private key management module TPKI_pks performs encryption by using the private key of the private key management module TPKI_pks. In the second negotiation process, the private key of the node is transmitted, and the private key of the node is encrypted by using the first random session key during transmission. After receiving the encrypted private key of the node, the private key management module TPKI_pks performs decryption by using the first random session key. When a third party intercepts content transmitted in one of the negotiation processes, the third party cannot crack the private key of the node at all. Even if the third party intercepts the content transmitted in the two negotiation processes, the third party cannot crack the private key of the node because only the private key management module TPKI_pks has the private key of the private key management module TPKI_pks. This provides double assurance for improving the transmission security of the private key of the private key management module TPKI_pks.

In an embodiment, the private key management module TPKI_pks may be a plurality of private key management modules TPKI_pks distributed in a plurality of places. After any private key management module TPKI_pks receives the private key transmitted by the node, the private key management module TPKI_pks may synchronize with private key management modules TPKI_pks in other places.

An advantage of the embodiment is to prevent the private key management module TPKI_pks from being set in only one place, so as to avoid a case that once the private key management module TPKI_pks is attacked and damaged, private keys hosted by the private key management module TPKI_pks for all nodes are lost. In the embodiment, the plurality of private key management modules TPKI_pks in the plurality of places are set. After any one of the private key management modules TPKI_pks receives the private key transmitted by the node, the private key management module TPKI_pks synchronizes with private key management modules TPKI_pks in other places. Even if a private key management module TPKI_pks in one place is damaged, private key management modules in other places can still find the hosted private key, thereby improving the security of private key hosting.

In an embodiment, when the private key management module TPKI_pks hosts the private key for storage, encryption may be performed by using a symmetric encryption algorithm, for example, encryption algorithms such as the data encryption standard (DES), the advanced encryption standard (AES), and 3DES. A key for encrypting the private key may be hard-coded in the private key management module. In this way, even if the encrypted private key is stolen by a third party, the third party still cannot decrypt the encrypted private key because the key for encrypting the private key is hard-coded in the private key management module TPKI_pks, thereby further improving the security of the hosted private key.

Figure 10:
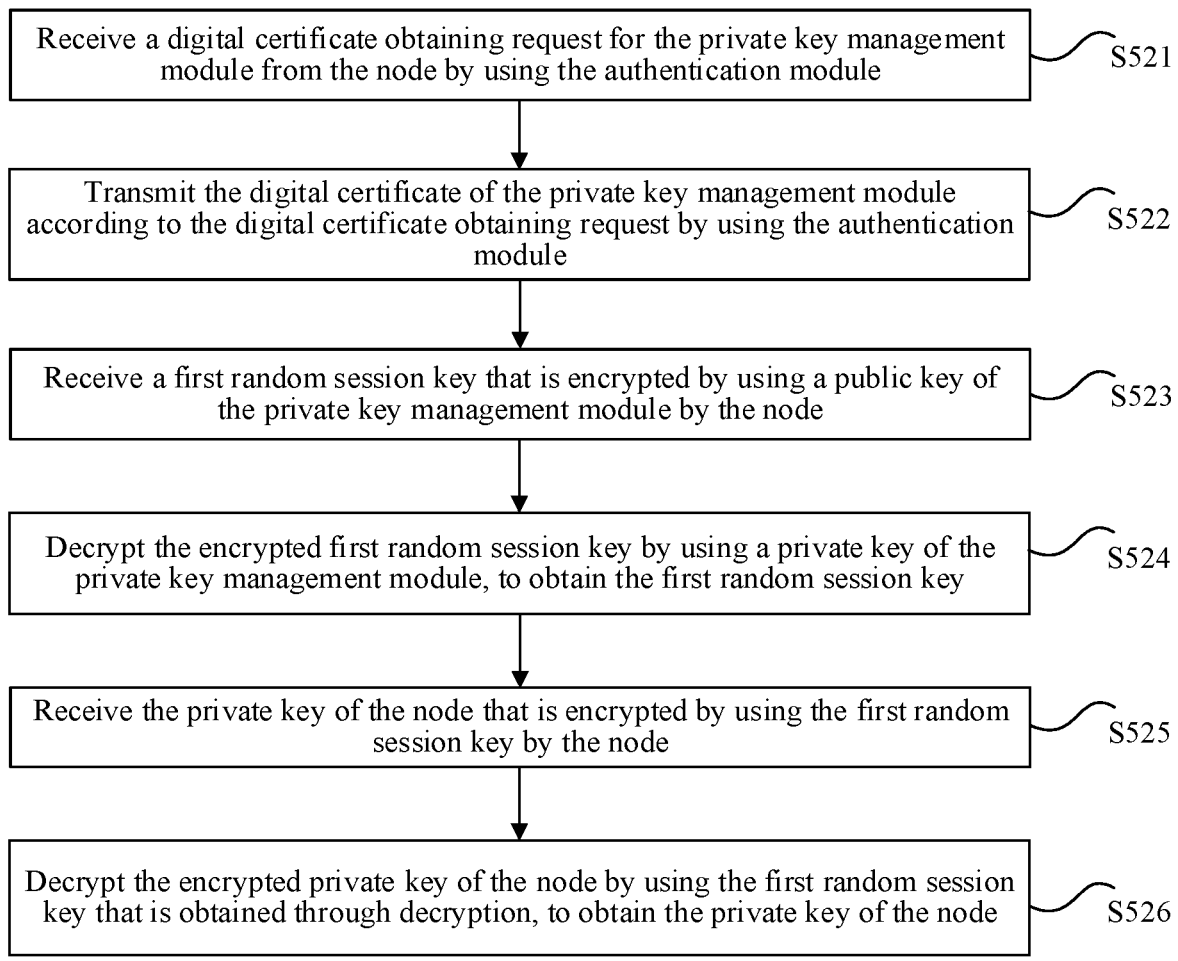
FIG. 10 is a flowchart of a method for receiving a private key transmitted by a node according to an embodiment of this application.

In an embodiment, before step 523, step 520 further includes a process of verifying the validity of the private key management module TPKI_pks. As shown in FIG. 10, step 520 further includes the following steps:

Step 521: Receive a request to obtain a digital certificate of the private key management module TPKI_pks from the node by using the authentication module TPKI_ca.

The digital certificate of the private key management module TPKI_pks is a document proving that the private key management module TPKI_pks has valid hosting qualification. In an embodiment, the digital certificate may be issued to the private key management module TPKI_pks by the authentication module TPKI_ca.

Step 522: Transmit the digital certificate of the private key management module TPKI_pks to the node according to the digital certificate obtaining request by using the authentication module TPKI_ca, the digital certificate including a signature formed by using the private key of the authentication module (TPKI_ca), for the node to perform verification by using the public key of the authentication module (TPKI_ca) after receiving the digital certificate.

The digital certificate of the private key management module TPKI_pks includes plaintext information and a signature generated for the plaintext information by using the private key of the authentication module TPKI_ca. The plaintext information includes basic information such as a name, a registration number, a registration time, authorized permissions, and an authorization time of the private key management module TPKI_pks. The method for generating the signature is the same as that in the foregoing descriptions. Therefore, details are not described herein again. The method in which after receiving the digital certificate, the node performs verification by using the public key of the authentication module (TPKI_ca) is also the same as that in the foregoing descriptions. Therefore, details are not described herein again.

An advantage of the embodiment is that the validity of the private key management module TPKI_pks may be verified before the private key of the node is hosted, thereby improving the hosting security of the private key.

Figure 11:
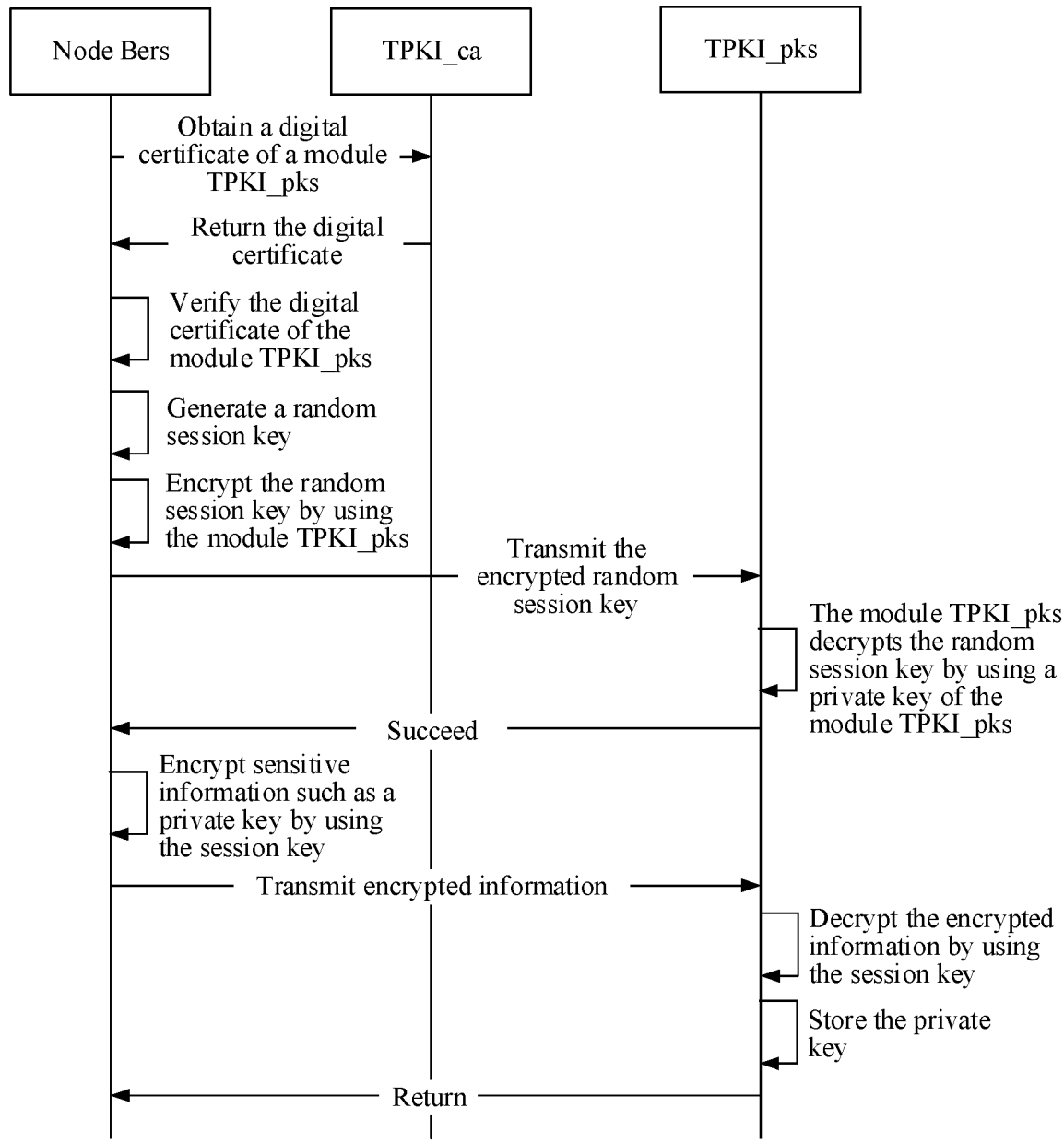
FIG. 11 is an interaction flowchart of a case in which a node enables a private key to be hosted by a private key management module according to an embodiment of this application.

As shown in FIG. 11, when the node Bers intends to enable a private key of the node Bers to be hosted, the node Bers first transmits a request to obtain a digital certificate of the private key management module TPKI_pks to the authentication module TPKI_ca. Next, the authentication module TPKI_ca returns the digital certificate of the private key management module TPKI_pks to the node Bers. Subsequently, the node Bers verifies the digital certificate returned by the authentication module TPKI_ca. Next, if the verification on the digital certificate succeeds, the node Bers generates a first random session key. Subsequently, the node Bers encrypts the generated first random session key by using the public key of the private key management module TPKI_pks. Subsequently, the node Bers transmits the encrypted first random session key to the private key management module TPKI_pks. The private key management module TPKI_pks may use the private key of the private key management module TPKI_pks to obtain the first random session key through decryption. Subsequently, the private key management module TPKI_pks may return, to the node Bers, reminder information representing that the session key is successfully obtained. Next, the node Bers may encrypt, by using the first random session key, various sensitive information including the private key of node Bers. Subsequently, the node Bers transmits the sensitive information such as the encrypted private key to the private key management module TPKI_pks. The private key management module TPKI_pks decrypts the encrypted private key by using the obtained first random session key, to obtain the private key of node Bers, and returns, to the node Bers, reminder information that indicates that the private key is successfully hosted. In this way, the entire solution in which the node Bers enables the private key to be hosted by the private key management module TPKI_pks is completed.

A node enables a private key to be hosted by the private key management module TPKI_pks, and when the node requires the private key, the node may obtain the private key of the node from the private key management module TPKI_pks. A process in which the node obtains the private key of the node from the private key management module TPKI_pks is described below.

Figure 12:
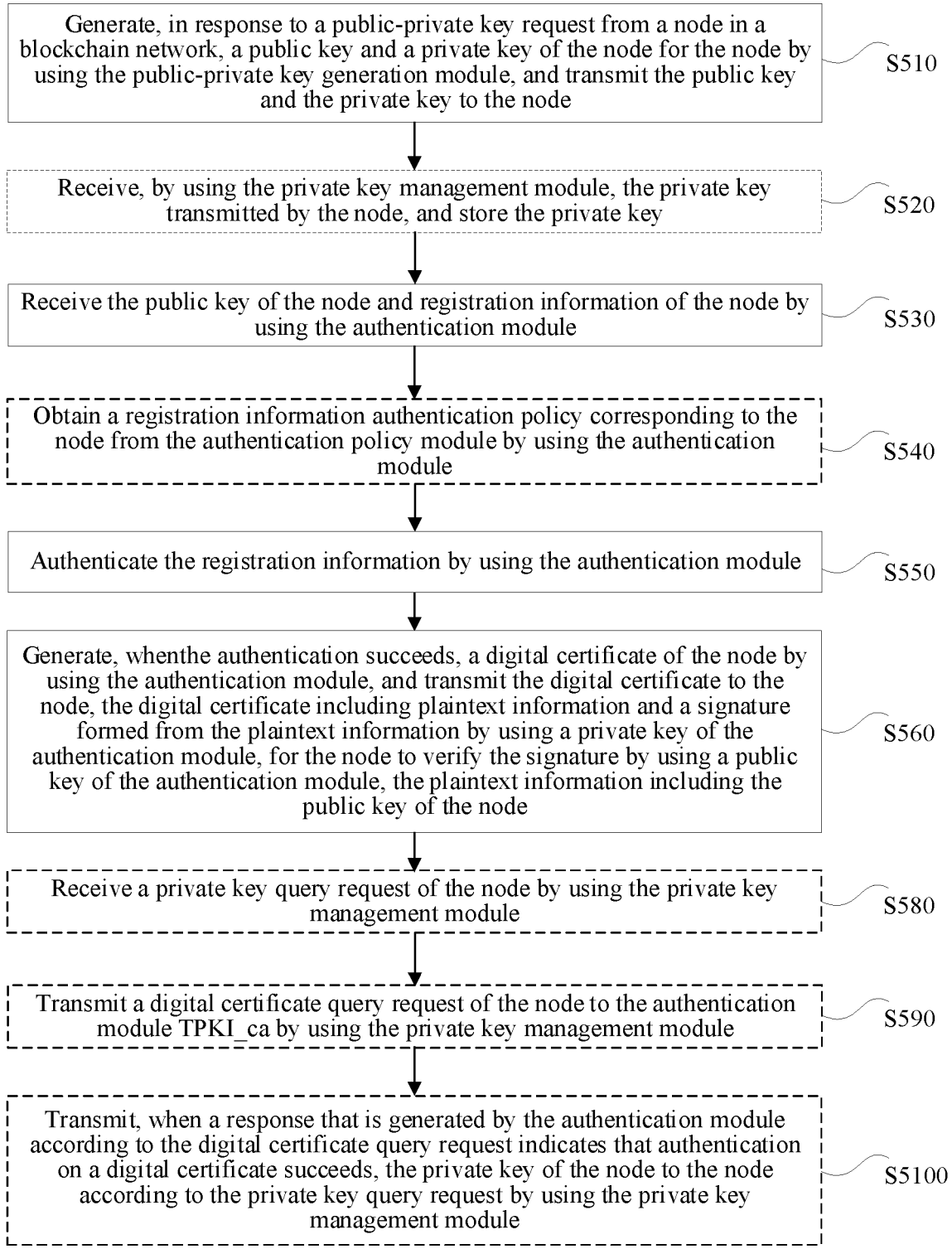
FIG. 12 is a flowchart of a method for issuing a digital certificate to a node in a blockchain network according to an embodiment of this application.

In an embodiment, after step 560, the method further includes step 580 to step 5100. As shown in FIG. 12, the method further includes the following steps:

Step 580: Receive a private key query request of the node by using the private key management module TPKI_pks.

The private key query request is a request that is transmitted by the node and is used for obtaining the hosted private key from the private key management module TPKI_pks, and may be a request created based on various network protocols, for example, requests of types such as the HTTP/HTTPS.

Step 590: Transmit a digital certificate query request of the node to the authentication module TPKI_ca by using the private key management module TPKI_pks.

Step 5100: Transmit, in accordance with a determination that a response that is generated by the authentication module (TPKI_ca) according to the digital certificate query request and indicates that authentication on a digital certificate succeeds is received, the private key of the node to the node according to the private key query request by using the private key management module TPKI_pks.

If the private key management module TPKI_pks returns, only according to a received private key query request, the hosted private key to a transmitter of the request, lawbreakers such as a hacker easily uses a counterfeit request to steal the private key hosted by the private key management module TPKI_pks, causing a severe loss. Therefore, the private key can only be returned to a node that has been issued with a digital certificate. Because the digital certificate proves the validity of a public key and a private key and the digital certificate is requested by the node, it is proved that the node has a permission to control the public key and the private key. Therefore, before the private key is returned, the digital certificate query request of the node needs to be transmitted to the authentication module TPKI_ca, and the authentication module can return the private key to the node only when the authentication module TPKI_ca finds that the node has a digital certificate.

In an embodiment, both the private key query request and the digital certificate query request have the public key of the node. As shown in FIG. 17A and FIG. 17B, the digital certificate has the public key of the node. The authentication module TPKI_ca finds the digital certificate of the node according to the public key.

In an embodiment, both the private key query request and the digital certificate query request have the identifier of the node. As shown in FIG. 17A and FIG. 17B, the digital certificate has the identifier of the node, for example, the enterprise identifier in FIG. 17A and the service provider identifier in FIG. 17B. The authentication module TPKI_ca finds the digital certificate of the node according to the identifier of the node.

In an embodiment, both the private key query request and the digital certificate query request have the sequence number of the digital certificate. As shown in FIG. 17A and FIG. 17B, the digital certificate has the sequence number of the digital certificate. The authentication module TPKI_ca finds the digital certificate of the node according to the sequence number.

Figure 13:
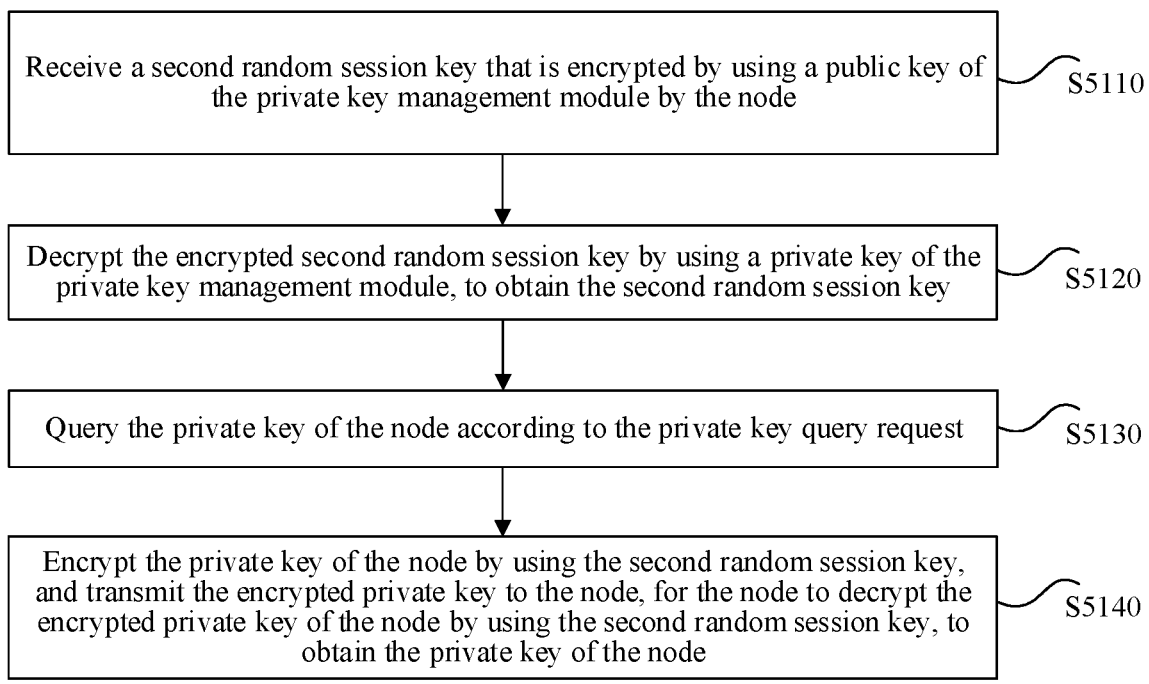
FIG. 13 is a flowchart of a method for transmitting a private key of a node to the node by a private key management module TPKI_pks according to an embodiment of this application.

In an embodiment, as shown in FIG. 13, the process in which the private key management module TPKI_pks transmits the private key of the node to the node according to the private key query request may include the following steps:

Step 5110: Receive a second random session key that is encrypted by using a public key of the private key management module TPKI_pks by the node.

The public key of the private key management module TPKI_pks is the same as that in the foregoing descriptions. Therefore, details are not described herein again.

Compared with the first random session key, the second random session key may be generated in the same generation manner by the node or may be generated in a different generation manner.

Step 5120: Decrypt the encrypted second random session key by using a private key of the private key management module TPKI_pks, to obtain the second random session key.

A process of decrypting the encrypted second random session key is similar to the foregoing process of decrypting the encrypted first random session key. Therefore, details are not described herein again.

Step 5130: Query the private key of the node according to the private key query request.

In an embodiment, step 525 includes: receiving the private key and public key of the node that are encrypted by using the first random session key by the node. Step 526 includes: decrypting the encrypted private key and the encrypted public key of the node by using the first random session key that is obtained through decryption, and correspondingly storing the obtained private key and the obtained public key. Step 5130 includes: querying, according to the public key of the node in the private key query request, the private key stored correspondingly with the public key.

In an embodiment, step 525 includes: receiving the private key of the node and the identifier of the node that are encrypted by using the first random session key by the node. Step 526 includes: decrypting the encrypted private key of the node and the encrypted identifier of the node by using the first random session key that is obtained through decryption, and correspondingly storing the obtained private key and the obtained identifier of the node. Step 5130 includes: querying, according to the identifier of the node in the private key query request, the private key stored correspondingly with the identifier.

Step 5140: Encrypt the private key of the node by using the second random session key, and transmit the encrypted private key to the node, for the node to decrypt the encrypted private key of the node by using the second random session key, to obtain the private key of the node.

In an embodiment, the second random session key is generated based on a symmetric encryption algorithm. A process of encrypting the private key of the node by using the second random session key, and decrypting the encrypted private key of the node by using the second random session key is similar to the foregoing process of encrypting the private key of the node by using the first random session key and decrypting the encrypted private key of the node by using the first random session key. Therefore, details are not described herein again. Similar to the two negotiations during private key hosting, two negotiations during the query of the private key also achieve the effect of improving the security of the private key during transmission.

In an embodiment, referring to FIG. 1C, the blockchain includes a plurality of sub-blockchains. For linking and querying a data block on different sub-blockchains, different public-private key pairs may be required, to further improve the security of using a public key and a private key on the blockchains. Even if a third party obtains a public key and a private key used for linking and querying on a sub-blockchain, it is difficult for the third party to know a public key and a private key used for linking and querying on another sub-blockchain.

In the embodiment, the public-private key request includes an identifier of a to-be-registered sub-blockchain. The generating a public key and a private key of the node for the node includes: generating a public key and a private key of the node that are on the to-be-registered sub-blockchain for the node. Specifically, the public keys and private keys on the sub-blockchains are generated for the node according to the identifiers of the to-be-registered sub-blockchains in the public-private key request. Although there are a plurality of sub-blockchains, some of the sub-blockchains may not be used by the node, so that only public keys and private keys on sub-blockchains that may be used subsequently need to be requested.

Only sub-blockchains of which public keys and private keys are requested need to be authenticated. Therefore, in the embodiment, the registration information includes to-be-registered sub-blockchains, and the sub-blockchains are consistent with the sub-blockchains for which the issuance of public keys and private keys is requested. Step 540 includes: obtaining a registration information authentication policy corresponding to the to-be-registered sub-blockchain from the authentication policy module TPKI_aus. In other words, each sub-blockchain has a different authentication policy, and authentication may be performed by using a corresponding authentication policy for each sub-blockchain (to-be-registered sub-blockchain) with which the node needs to register.

Step 550 includes: authenticating the registration information on the to-be-registered sub-blockchain based on the registration information authentication policy corresponding to the to-be-registered sub-blockchain. The plaintext information includes a public key on a sub-blockchain on which authentication succeeds.

Because the node separately performs authentication on each to-be-registered sub-blockchain, authentication may succeed on some to-be-registered sub-blockchains, and authentication may fail on other to-be-registered sub-blockchains. In this case, a certificate is only issued to the sub-blockchains on which authentication succeeds. That is, plaintext information of the certificate includes only public keys on the sub-blockchains on which authentication succeeds. In this way, the sub-blockchains on which authentication performed by the node succeeds and that have permissions can be determined only according to the public keys included in the plaintext information of the digital certificate.

For example, to-be-registered sub-blockchains corresponding to the node are a sub-blockchain 2 and a sub-blockchain 3. An authentication policy of the sub-blockchain 2 is that an address is in Shenzhen city, and an authentication policy of the sub-blockchain 3 is that the population of the organization is greater than 500. An enterprise is a factory in Beijing and has more than two thousand people. In this case, authentication succeeds on the sub-blockchain 3, and authentication fails on the sub-blockchain 2. Only a public key on the sub-blockchain 3 is written into the plaintext information of the digital certificate.

An advantage of the embodiment is that different authentication may be performed for different sub-blockchains in accordance with a determination that there are a plurality of sub-blockchains, to obtain authentication results of different sub-blockchains, so that the proof of the digital certificate for the validity of a public key and a private key is accurate to the level of a sub-blockchain, thereby improving the flexibility of using the digital certificate.

In an embodiment, the private key query request includes a sub-blockchain to which a private key to be queried belongs, and the digital certificate query request of the node includes the sub-blockchain to which the private key to be queried belongs, so that the authentication module TPKI_ca determines, according to whether the sub-blockchain to which the private key to be queried belongs is a sub-blockchain corresponding to a public key that is included in the plaintext information of the digital certificate and on which authentication succeeds, whether to transmit a response that indicates that authentication on a digital certificate succeeds.

In other words, in the foregoing embodiment, in step 5100, the authentication module TPKI_ca may query, only according to the identifier of the node in the digital certificate query request, whether a digital certificate has been issued to the node, and if yes, a response that indicates that authentication on a digital certificate succeeds may be transmitted to the private key management module TPKI_pks. However, in this embodiment, because there are different sub-blockchains, it further needs to be specifically verified whether the node has a permission on a sub-blockchain from which the node intends to obtain a private key. In this case, the plaintext information of the digital certificate of the node needs to be searched for public keys included in the plaintext information. Sub-blockchains corresponding to the public keys are sub-blockchains on which the node has permissions, and a response that indicates that authentication on a digital certificate succeeds may be transmitted for the sub-blockchains, the response including the sub-blockchains on which authentication succeeds. The private key management module TPKI_pks returns queried private keys for the node only according to the sub-blockchains on which authentication succeeds. For example, the node may request private keys on the sub-blockchain 2 and the sub-blockchain 3, but the authentication module TPKI_ca queries the digital certificate of the node to find that the digital certificate only includes a public key on the sub-blockchain 3. Therefore, only a private key on the sub-blockchain 3 is returned to the node.

An advantage of the embodiment is that, in accordance with a determination that there are a plurality of sub-blockchains, the flexibility of querying a hosted private key is improved. The node can only find private keys that are authenticated and have corresponding public keys in the digital certificate.

In an embodiment, the authentication module TPKI_ca transmits a response that indicates that authentication on a digital certificate succeeds to the private key management module TPKI_pks. In addition to the foregoing verification, it further needs to be verified whether the digital certificate expires, and if the digital certificate expires, a digital certificate needs to be re-registered. As shown in FIG. 17A and FIG. 17B, the plaintext information further includes a valid time. After the authentication module TPKI_ca is transmitted to the digital certificate query request of the node by using the private key management module TPKI_pks, the authentication module TPKI_ca finds the digital certificate corresponding to the node, and performs valid time verification on the digital certificate according to a comparison between the valid time in the digital certificate and a current time. The response that indicates that authentication on a digital certificate succeeds is transmitted to the private key management module TPKI_pks only in accordance with a determination that the valid time verification succeeds.

Specifically, the valid time may be an expiry time before which the digital certificate is valid. If the valid time is earlier than the current time, the verification fails. If the valid time is later than the current time, the verification succeeds. The benefit of the embodiment is that the time validity of the digital certificate is verified, thereby further improving the public credibility of the digital certificate.

Because even if the digital certificate does not expire, the digital certificate may be revoked due to factors such as an invalid organization. In an embodiment, the authentication module TPKI_ca transmits a response that indicates that authentication on a digital certificate succeeds to the private key management module TPKI_pks. In addition to the foregoing verification, the status of the digital certificate, that is, whether the digital certificate is revoked, further needs to be verified, and if the digital certificate is revoked, no private key can be issued to the node. As shown in FIG. 17A and FIG. 17B, the plaintext information further includes certificate status information. After the private key management module TPKI_pks transmits the digital certificate query request of the node to the authentication module TPKI_ca, the authentication module TPKI_ca performs status verification on the digital certificate according to the certificate status information, and transmits the response that indicates that authentication on a digital certificate succeeds to the private key management module TPKI_pks only in accordance with a determination that the status verification succeeds.

Specifically, if the certificate status information indicates that the digital certificate is normal, the status verification succeeds; and if the certificate status information indicates that the digital certificate is revoked, the status verification fails. The benefit of the embodiment is that the status of the digital certificate is verified, thereby further improving the public credibility of the digital certificate.

In an embodiment, the node includes an organization node and a service provider node. A service provider is an entity that entrusts an accounting node 101 to link transaction information or perform a query for organizations that are not qualified to link transaction information or perform a query (that is, the organizations are not the accounting nodes 101 in FIG. 1A to FIG. 1C) or are not qualified to entrust the accounting node 101 to link the transaction information or perform a query (that is, the organizations are neither the transaction information generator nodes 102 in FIG. 1A nor the service node 105 in FIG. 1B and FIG. 1C) and accepts entrustment from the organizations. Certainly, in some cases, an organization that is qualified to link transaction information or perform a query or is qualified to entrust the accounting node 101 to link the transaction information or perform a query still entrusts a service provider to perform linking or perform a query.

The service provider links entrusted transaction information and performs a query in place of some organizations, and a private key queried by the service provider may be not only a private key of the service provider but also a private key of a node of an organization from which the service provider accepts entrustment. Therefore, when a digital certificate is issued to the service provider node, permission information of the service provider node is recorded and stored. When the service provider node queries a private key in place of an organization node, the private key query request includes an identifier of the service provider node and an identifier of a node to which a key to be queried by the service provider node belongs, and the authentication module TPKI_ca determines, according to the stored permission information, whether the identifier of the node to which the key to be queried by the service provider node belongs is the identifier of the organization served by the service provider node or the service provider node. If yes, the authentication succeeds. Otherwise, the authentication fails.

Specifically, when the node is a service provider node, the receiving the public key of the node and registration information of the node includes: receiving the public key of the node, the registration information of the node, and permission information of an organization served by the service provider node. For example, a service provider node A links entrusted transaction information or perform a query in place of organization nodes A1, A2, and A3, and the permission information includes A1, A2, and A3.

In the embodiment, in accordance with a determination that the digital certificate issuing center further includes an authentication policy module (TPKI_aus), after the registration information is authenticated by using the authentication module TPKI_ca, the method further includes:

transmitting, in accordance with a determination that the authentication succeeds, the permission information to the authentication policy module TPKI_aus by using the authentication module TPKI_ca for storage. Specifically, the identifier of the node and the permission information may be correspondingly stored.

In the embodiment, the private key query request includes the identifier of the service provider node and the identifier of the node to which the key to be queried by the service provider node belongs, and the authentication succeeds in accordance with a determination that the authentication module TPKI_ca determines, according to the permission information stored by the authentication policy module TPKI_aus, that the identifier of the node to which the key to be queried by the service provider node belongs is the identifier of the organization served by the service provider node or the service provider node. For example, permission information of the service provider node A that is stored by the authentication policy module TPKI_aus includes organization nodes A1, A2, and A3, and if the key to be queried by the service provider node is a private key of one or more of the organization nodes A1, A2, A3, and A, the authentication succeeds, and the private key can be returned to the service provider node.

The benefit of the embodiment is that support in the implementation aspects of the private key management technology is provided for a scenario in which a service provider node entrusts linking or performs a query in place of a plurality of organization nodes.

Because a sub-blockchain is often specific to data blocks of a specific type of transaction information, for example, one sub-blockchain records data blocks of transaction information of supply chain finance, and another sub-blockchain records data blocks of transaction information of electronic invoices. A transaction type of one type of nodes is also relatively fixed, so that a sub-blockchain that needs to perform recording is also relatively fixed. Therefore, in an embodiment, a permission of a sub-blockchain may be automatically set for the node according to the transaction type of the node. For example, an automobile manufacturing enterprise often requires a supply chain finance service, but also uses electronic invoices. Therefore, a sub-blockchain of supply chain finance and a sub-blockchain of electronic invoices are required.

In the embodiment, the blockchain includes a plurality of sub-blockchains, and the registration information includes the type of the node. The generating a public key and a private key of the node for the node includes: generating, for the node, public keys and private keys of the node that are on different sub-blockchains. Assuming that there are a total of N sub-blockchains, N public-private key pairs corresponding to the N sub-blockchains may be generated for the node.

In a case that the digital certificate issuing center further includes an authentication policy module (TPKI_aus), in step 550, after the registration information is authenticated by using the authentication module TPKI_ca, the method further includes:

generating, in accordance with a determination that the authentication succeeds, sub-blockchain permission information specific to the type of the node based on the type of the node by using the authentication module TPKI_ca, and storing the sub-blockchain permission information in the authentication policy module TPKI_aus, the sub-blockchain permission information including sub-blockchains that allow query for different service types.

The sub-blockchain permission information specific to the type of the node may be obtained by searching a preset table of correspondence between a node type and sub-blockchain permission information according to the type of the node. For example, in the table of correspondence, sub-blockchain permission information corresponding to an automobile manufacturing enterprise is: for a supply chain finance service type, a sub-blockchain that allows query is a sub-blockchain 2, and for an electronic invoice service type, a sub-blockchain that allows query is a sub-blockchain 3. Subsequently, the sub-blockchain permission information is stored in the authentication policy module TPKI_aus.

In the embodiment, the private key query request includes the type of the node and a service type, and the digital certificate query request also includes the type of the node and the service type. The authentication module TPKI_ca queries the sub-blockchain permission information specific to the type of the node from the authentication policy module TPKI_aus, determines, according to the sub-blockchain permission information and the service type, a sub-blockchain that allows query, puts the sub-blockchain that allows query into the response that indicates that authentication on a digital certificate succeeds, and transmits the response to the private key management module TPKI_pks. The transmitting the private key of the node to the node includes: transmitting, to the node, a private key, on the sub-blockchain that allows query, of the node.

For example, the type of the node is an automobile manufacturing enterprise node, and the service type is an electronic invoice service type. The authentication module TPKI_ca first finds, from the authentication policy module TPKI_aus according to the type of the node, namely, an automobile manufacturing enterprise node, in the digital certificate query request, the sub-blockchain permission information corresponding to the type of the node, that is, for a supply chain finance service type, a sub-blockchain that allows query is a sub-blockchain 2, and for an electronic invoice service type, a sub-blockchain that allows query is a sub-blockchain 3. Subsequently, it is determined, according to the service type in the digital certificate query request, namely, the electronic invoice service type, that the sub-blockchain that allows query is the sub-blockchain 3. The sub-blockchain 3 is put into the response that indicates that authentication on a digital certificate succeeds, and the response is transmitted to the private key management module TPKI_pks. In this case, the private key management module TPKI_pks only returns, to the node, a private key, on the sub-blockchain 3, of the node, and does not return private keys on other sub-blockchains to the node.

An advantage of the manner is that in accordance with a determination that there are a plurality of sub-blockchains, a private key on a sub-blockchain suitable for the type of the node and the service type may be accurately found for a user, thereby implementing fine management of private key hosting in accordance with a determination that there are a plurality of sub-blockchains.

Figure 14:
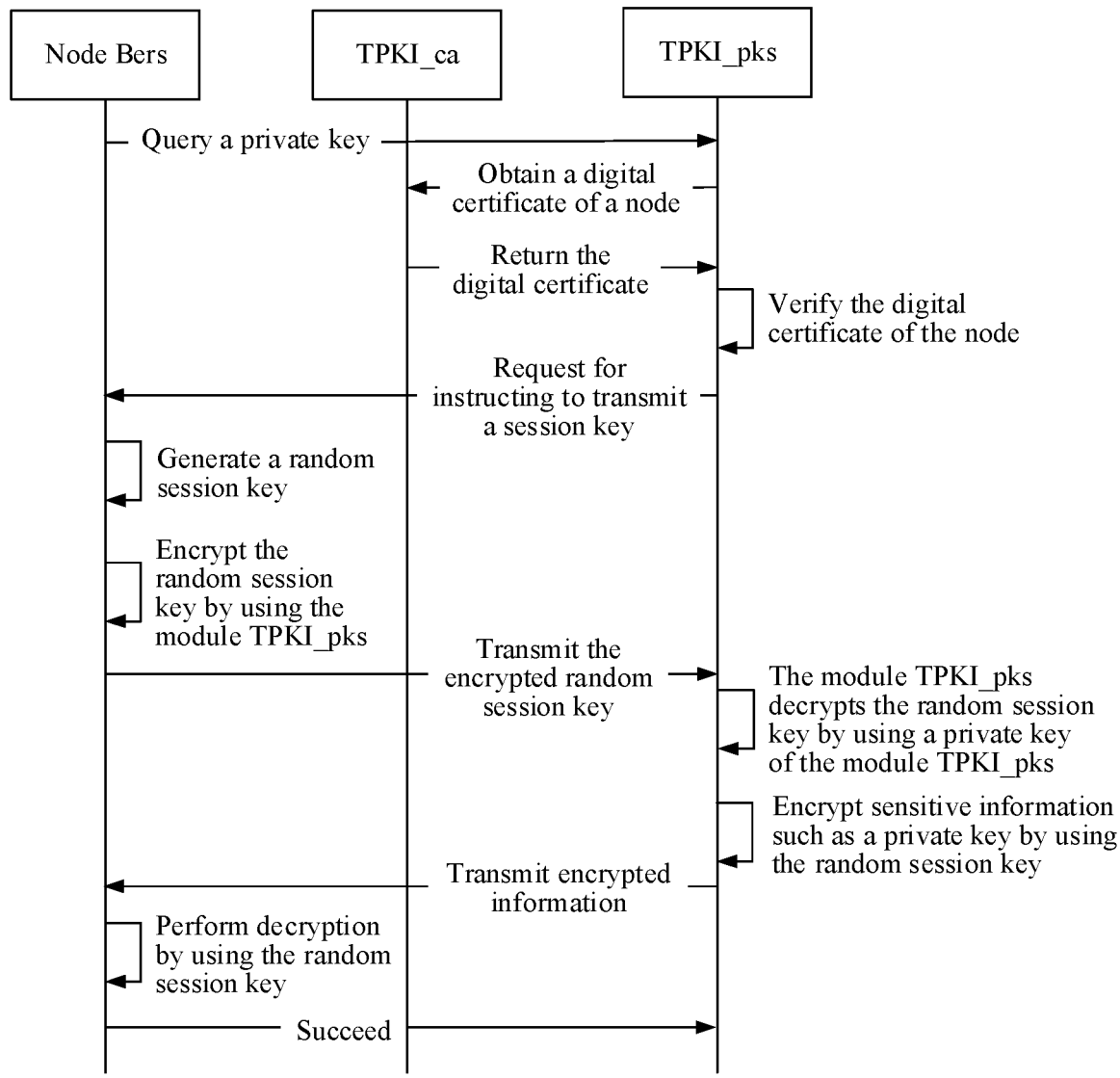
FIG. 14 is an interaction flowchart of a case in which a node obtains a hosted private key from a private key management module according to an embodiment of this application.

FIG. 14 is a flowchart of detailed interaction for the node to query for a hosted private key. When a node Bers needs to query a private key hosted for the node Bers by the private key management module TPKI_pks, the node Bers first transmits a private key query request to the private key management module TPKI_pks hosting the private key for the node Bers. The private key management module TPKI_pks transmits a digital certificate query request to the authentication module TPKI_ca. Subsequently, the authentication module verifies, according to the request, whether the node has a digital certificate, whether the digital certificate expires, whether the digital certificate is revoked, and the like. If all the verification succeeds, the authentication module TPKI_ca transmits a response that indicates that authentication on a digital certificate succeeds to the private key management module TPKI_pks. The private key management module TPKI_pks then transmits, to the node Bers, a request for instructing the node Bers to transmit a session key. The node Bers generates a second random session key, and encrypts the second random session key by using the public key of the private key management module TPKI_pks. The node Bers transmits the encrypted second random session key to the private key management module TPKI_pks. After receiving the encrypted second random session key, the private key management module TPKI_pks first decrypts the encrypted second random session key by using the private key of the private key management module TPKI_pks, to obtain the second random session key. Subsequently, the private key management module TPKI_pks encrypts the hosted private key of the node by using the second random session key, and transmits the encrypted private key to the node Bers. After the node Bers receives encrypted information, because the node has the second random session key, the node Bers may decrypt, by using the second random session key, the private key encrypted by using the second random session key, to obtain the private key hosted by the private key management module (TPKI_pks) for the node Bers. In the last stage, the node Bers may return, to the private key management module TPKI_pks, an acknowledgement message that indicates that the hosted private key is successfully received.

Figure 15:
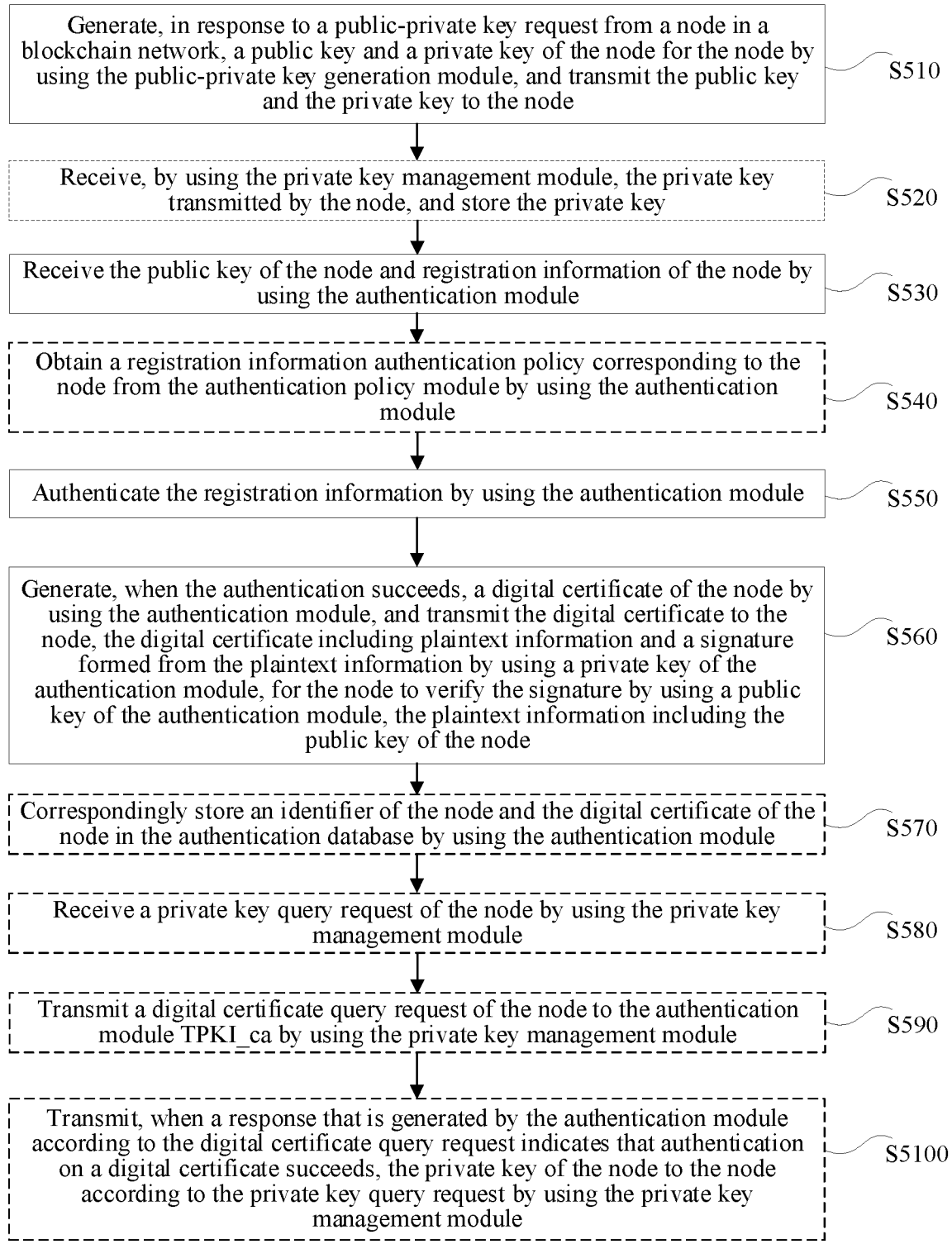
FIG. 15 is a flowchart of a method for issuing a digital certificate to a node in a blockchain network according to an embodiment of this application.

In an embodiment, the registration information includes the identifier of the node. The digital certificate issuing center includes an authentication database TPKI_cadb, as shown in FIG. 15. The authentication database TPKI_cadb is a database for storing issued digital certificates.

After the generating a digital certificate of the node by using the authentication module TPKI_ca, the method further includes: step 570, that is, correspondingly store the identifier of the node and the digital certificate of the node in the authentication database TPKI_cadb by using the authentication module TPKI_ca.

In the embodiment, the private key query request includes the identifier of the node, and the digital certificate query request includes the identifier of the node, for the authentication module TPKI_ca to determine, according to whether a digital certificate correspondingly stored with the identifier is present in the authentication database TPKI_cadb, whether the authentication succeeds. In other words, when the authentication module TPKI_ca receives the digital certificate query request and queries the digital certificate of the node to determine whether to transmit, to the private key management module TPKI_pks, the response that indicates that authentication on a digital certificate succeeds, the authentication database TPKI_cadb is searched according to the identifier of the node in the digital certificate query request for the corresponding digital certificate.

Figure 16:
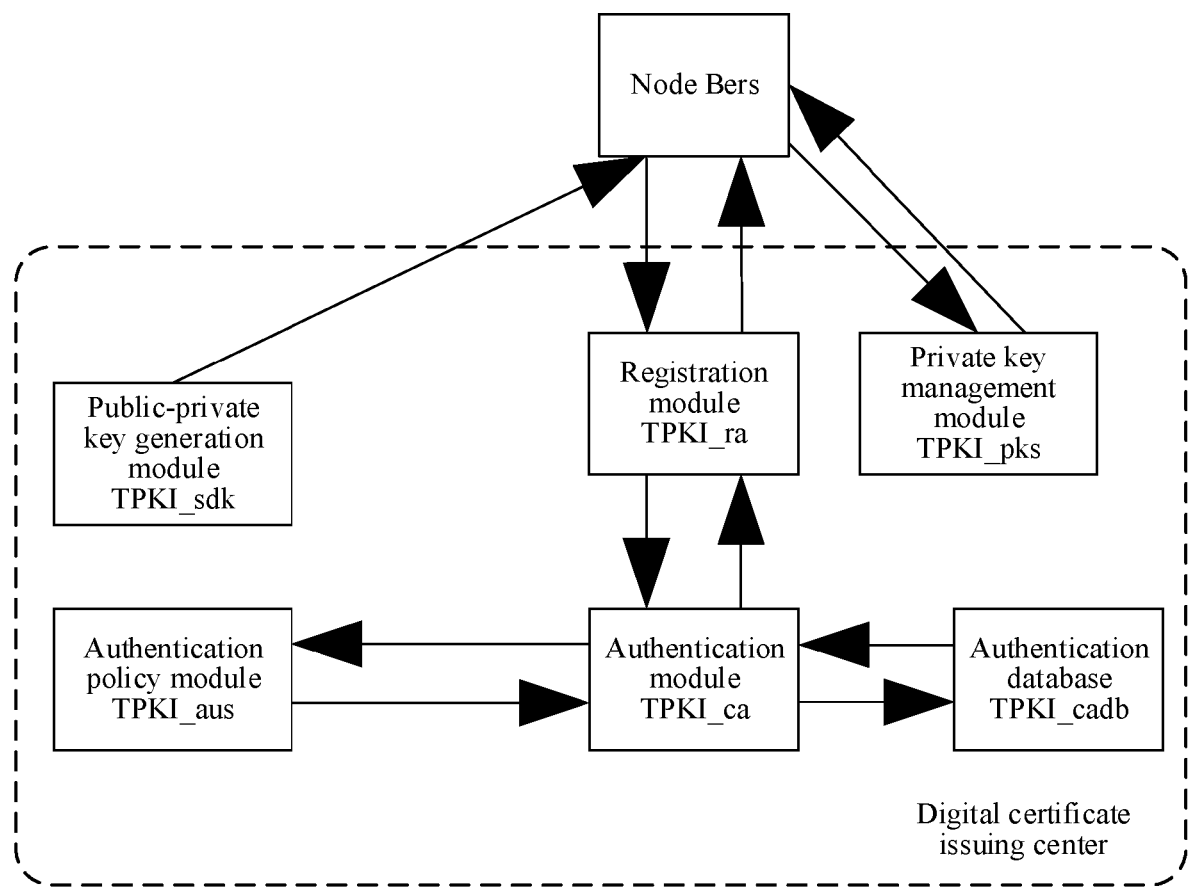
FIG. 16 is a detailed diagram of modules in a digital certificate issuing center according to an embodiment of this application.

FIG. 16 is a detailed diagram of modules in a digital certificate issuing center according to an embodiment of this application. As shown in FIG. 16, in addition to the public-private key generation module TPKI_sdk, the authentication module TPKI_ca, the authentication policy module TPKI_aus, the private key management module TPKI_pks, and the authentication database TPKI_cadb that are described above, in this embodiment, the digital certificate issuing center further includes a registration module TPKI_ra. The registration module TPKI_ra is a module for transmitting a public key and registration information that are received from a node Bers to the authentication module TPKI_ca and returning a generated digital certificate to the node Bers, and is an intermediate module between the node Bers and the authentication module TPKI_ca. That is, step 530 includes: receiving the public key of the node and the registration information of the node that are forwarded by the registration module TPKI_ra. The transmitting the digital certificate to the node in step 560 includes: transmitting the digital certificate to the node by the registration module TPKI_ra.

According to an embodiment of this application, as shown in FIG. 6, a digital certificate issuing center is further provided, including:

a public-private key generation module TPKI_sdk, configured to: generate, in response to a public-private key request from a node in a blockchain network, a public key and a private key of the node for the node, and transmit the public key and the private key to the node; and an authentication module TPKI_ca, configured to: receive the public key of the node and registration information of the node, authenticate the registration information, generate, in accordance with a determination that the authentication succeeds, a digital certificate of the node, and transmit the digital certificate to the node, the digital certificate including plaintext information and a signature formed from the plaintext information by using a private key of the authentication module TPKI_ca, for the node to verify the signature by using a public key of the authentication module TPKI_ca, the plaintext information including the public key of the node.

In an embodiment, referring to FIG. 6, the digital certificate issuing center further includes an authentication policy module TPKI_aus. The authentication policy module TPKI_aus is configured to store registration information authentication policies corresponding to nodes in the blockchain network.

In an embodiment, as shown in FIG. 8, the digital certificate issuing center further includes: a private key management module TPKI_pks, configured to: receive the private key transmitted by the node, and store the private key.

In an embodiment, the authentication module TPKI_ca is configured to:

receive a first random session key that is encrypted by using a public key of the private key management module TPKI_pks by the node;

decrypt the encrypted first random session key by using a private key of the private key management module TPKI_pks, to obtain the first random session key;

receive the private key of the node that is encrypted by using the first random session key by the node; and decrypt the encrypted private key of the node by using the first random session key that is obtained through decryption, to obtain the private key of the node.

In an embodiment, the authentication module TPKI_ca is further configured to:

receive a request to obtain a digital certificate of the private key management module TPKI_pks transmitted by the node; and transmit the digital certificate of the private key management module TPKI_pks to the node according to the digital certificate obtaining request, the digital certificate including a signature formed by using the private key of the authentication module TPKI_ca, for the node to perform verification by using the public key of the authentication module TPKI_ca after receiving the digital certificate of the private key management module TPKI_pks.

In an embodiment, the private key management module TPKI_pks is further configured to:

receive a private key query request of the node;

transmit a digital certificate query request of the node to the authentication module TPKI_ca; and transmit, in accordance with a determination that a response that is generated by the authentication module TPKI_ca according to the digital certificate query request and indicates that authentication on a digital certificate succeeds is received, the private key of the node to the node according to the private key query request by using the private key management module TPKI_pks.

In an embodiment, the private key management module TPKI_pks is further configured to:

receive a second random session key that is encrypted by using a public key of the private key management module TPKI_pks by the node;

decrypt the encrypted second random session key by using a private key of the private key management module TPKI_pks, to obtain the second random session key;

query the private key of the node according to the private key query request; and encrypt the private key of the node by using the second random session key, and transmit the encrypted private key to the node, for the node to decrypt the encrypted private key of the node by using the second random session key, to obtain the private key of the node.

In an embodiment, the registration information includes the identifier of the node. As shown in FIG. 16, the digital certificate issuing center includes an authentication database TPKI_cadb, configured to correspondingly store the identifier of the node and the digital certificate of the node, the private key query request including the identifier of the node, the digital certificate query request including the identifier of the node, for the authentication module TPKI_ca to determine, according to whether a digital certificate correspondingly stored with the identifier is present in the authentication database TPKI_cadb, whether the authentication succeeds.

In an embodiment, the node includes an organization node and a service provider node;

when the node is a service provider node, the receiving the public key of the node and registration information of the node includes: receiving the public key of the service provider node, the registration information of the service provider node, and permission information of an organization served by the service provider node;

if the digital certificate issuing center further includes an authentication policy module TPKI_aus, the authentication module TPKI_ca is further configured to: transmit, in accordance with a determination that the authentication succeeds, the permission information to the authentication policy module TPKI_aus for storage; and the private key query request includes an identifier of the service provider node and an identifier of a node to which a key to be queried by the service provider node belongs, and the authentication module TPKI_ca is further configured to determine that the authentication succeeds in accordance with a determination that it is determined, according to the permission information stored by the authentication policy module TPKI_aus, that the identifier of the node to which the key to be queried by the service provider node belongs is the identifier of the organization served by the service provider node or the service provider node.

In an embodiment, the registration information authentication policy corresponding to the node includes a registration information authentication policy specific to the type of the node; the registration information includes the type of the node; and the authentication module TPKI_ca is further configured to: obtain the registration information authentication policy specific to the type of the node from the authentication policy module TPKI_aus.

In an embodiment, a blockchain includes a plurality of sub-blockchains, and the generating a public key and a private key of the node for the node includes: generating, for the node, a public key and a private key of the node that are on a to-be-registered sub-blockchain; the registration information includes the to-be-registered sub-blockchain; the authentication module TPKI_ca is further configured to: obtain a registration information authentication policy corresponding to the to-be-registered sub-blockchain from the authentication policy module TPKI_aus; and authenticate the registration information on the to-be-registered sub-blockchain based on the registration information authentication policy corresponding to the to-be-registered sub-blockchain, the plaintext information including a public key on a sub-blockchain on which authentication succeeds.

In an embodiment, the private key query request includes a sub-blockchain to which a private key to be queried belongs, and the digital certificate query request of the node includes the sub-blockchain to which the private key to be queried belongs, so that the authentication module TPKI_ca determines, according to whether the sub-blockchain to which the private key to be queried belongs is a sub-blockchain corresponding to a public key that is included in the plaintext information of the digital certificate and on which authentication succeeds, whether to transmit a response that indicates that authentication on a digital certificate succeeds.

In an embodiment, a blockchain includes a plurality of sub-blockchains; the registration information includes the type of the node; the public-private key generation module TPKI_sdk is configured to: generate, for the node, public keys and private keys of the node that are on different sub-blockchains; in accordance with a determination that the digital certificate issuing center further includes the authentication policy module TPKI_aus, the authentication module TPKI_ca is further configured to: generate, after the authenticating the registration information, in accordance with a determination that the authentication succeeds, sub-blockchain permission information specific to the type of the node based on the type of the node, and store the sub-blockchain permission information in the authentication policy module TPKI_aus, the sub-blockchain permission information including sub-blockchains that allow query for different service types, the private key query request including the type of the node and a service type, the digital certificate query request including the type of the node and the service type, and the authentication module TPKI_ca queries the sub-blockchain permission information specific to the type of the node from the authentication policy module TPKI_aus, determines, according to the sub-blockchain permission information and the service type, a sub-blockchain that allows query, puts the sub-blockchain that allows query into the response that indicates that authentication on a digital certificate succeeds, and transmits the response to the private key management module TPKI_pks. The transmitting the private key of the node to the node includes: transmitting, to the node, a private key, on the sub-blockchain that allows query, of the node.

In an embodiment, the private key stored in the private key management module TPKI_pks is stored in an encrypted manner, and a password for encryption is hard-coded in the private key management module TPKI_pks.

Figure 18:
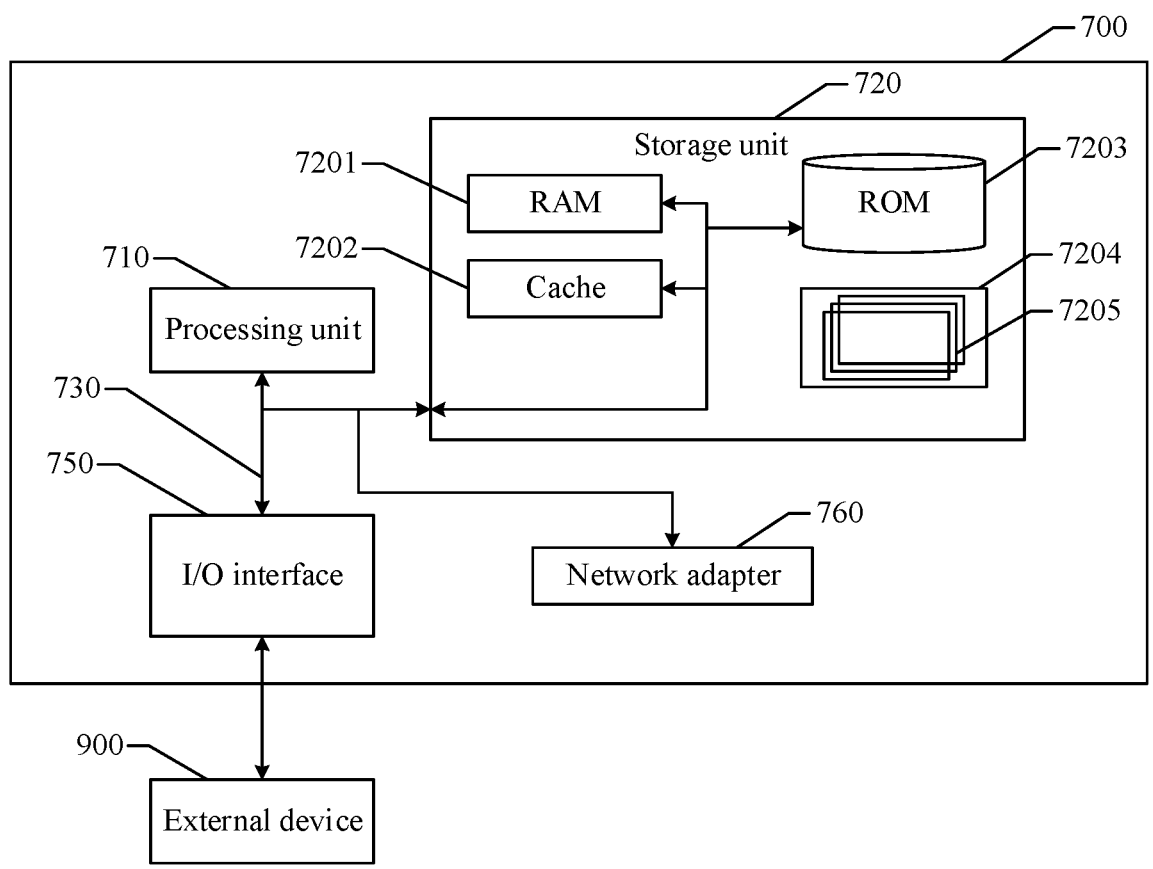
FIG. 18 is a structural diagram of hardware of a digital certificate issuing center according to an embodiment of this application.

The method for issuing a digital certificate to a node in a blockchain network according to this embodiment of this application may be implemented by the digital certificate issuing center 103 in FIG. 18. The digital certificate issuing center 103 according to this embodiment of this application is described below with reference to FIG. 18. The digital certificate issuing center 103 shown in FIG. 18 is only an example, and does not impose any limitation on the functions and use range of the embodiments of this application.

As shown in FIG. 18, the digital certificate issuing center 103 is shown in the form of a general-purpose computing device. Components of the digital certificate issuing center 103 may include, but are not limited to: at least one of the foregoing processing units 710, at least one of the foregoing storage units 720, a bus 730 connected to different system components (including the storage unit 720 and the processing unit 710).

The storage unit stores program code, and the program code may be executed by the processing unit 710, so that the processing unit 710 performs the steps according to various exemplary implementations of the present disclosure described in the descriptions of the foregoing exemplary methods of the specification. For example, the processing unit 710 may perform the steps shown in FIG. 5.

The storage unit 720 may include a readable medium in the form of a volatile storage unit, for example, a random access memory (RAM) 7201 and/or a cache storage unit 7202, and may further include a read-only storage unit (ROM) 7203.

The storage unit 720 may further include a program/utility 7204 having a group of (at least one) program modules 7205. Such a program module 7205 includes, but is not limited to, an operating system, one or more application programs, other program modules, and program data. Each or a combination of these examples may include implementation of a network environment.

The bus 730 may represent one or more of several types of bus structures, including a storage unit bus or a storage unit controller, a peripheral bus, an accelerated graphics port, a processing unit, or a local bus using any bus structure in a plurality of types of bus structures.

The digital certificate issuing center 103 may alternatively communicate with one or more external devices 900 (for example, a keyboard, a pointing device, and a Bluetooth device), or may communicate with one or more devices that enable a user to interact with an accounting node 21, and/or communicate with any device (for example, a router or a modem) that enables the digital certificate issuing center 103 to communicate with one or more other computing devices. Such communication may be performed by using an input/output (I/O) interface 750. In addition, the digital certificate issuing center 103 may further communicate with one or more networks (for example, a local area network (LAN), a wide area network (WAN), and/or a public network such as the Internet) through a network adapter 760. As shown in the figure, the network adapter 760 communicates with other modules in the digital certificate issuing center 103 by using the bus 730. It is to be understood that although not shown in the figure, other hardware and/or software modules may be used in combination with the digital certificate issuing center 103, including, but not limited to microcode, a device driver, a redundancy processing unit, an external disk drive array, a RAID system, a tape drive, a data backup storage system, or the like.

Through descriptions of the foregoing implementations, it is easy for a person skilled in the art to understand that the exemplary implementations described herein can be implemented by software or by combining software with necessary hardware. Therefore, the technical solutions of the implementations of this application may be implemented in the form of a software product. The software product may be stored in a non-volatile storage medium (which may be a CD-ROM, a USB flash drive, a removable hard disk, or the like) or in a network and includes several instructions for instructing a computer device (which may be a personal computer, a server, a terminal device, a network device, or the like) to perform the methods described in the implementations of this application.

In an exemplary embodiment of this application, a computer program medium is further provided, storing computer-readable instructions, the computer-readable instructions, when being executed by a processor of a computer, causing the computer to perform the method described in the foregoing method embodiments.

According to an embodiment of this application, a program product for implementing the method in the foregoing method embodiments is further provided. The program product may use a portable compact disc read-only memory (CD-ROM) and include program code, and may be run on a terminal device such as a personal computer. However, the program product in the present disclosure is not limited thereto. In this specification, the readable storage medium may be any tangible medium including or storing a program, and the program may be used by or used in combination with an instruction execution system, an apparatus, or a device.

The program product may use any combination of one or more readable media. The readable medium may be a readable signal medium or a readable storage medium. The readable storage medium may be, for example, but not limited to, an electric, magnetic, optical, electromagnetic, infrared, or semi-conductive system, apparatus, or device, or any combination thereof. More specific examples (a non-exhaustive list) of the readable storage medium may include: an electrical connection having one or more wires, a portable disk, a hard disk, a RAM, a read-only memory (ROM), an erasable programmable read-only memory (EPROM or flash memory), an optical fiber, a portable CD-ROM, an optical storage device, a magnetic storage device, or any appropriate combination thereof.

The computer-readable signal medium may include a data signal propagated in a baseband or as part of a carrier, and stores readable program code. The propagated data signal may be in a plurality of forms, including, but not limited to, an electromagnetic signal, an optical signal, or any appropriate combination thereof. The readable signal medium may alternatively be any readable medium other than the readable storage medium. The readable medium may send, propagate, or transmit a program configured to be used by or in combination with an instruction execution system, apparatus, or device.

The program code included in the readable medium may be transmitted by using any appropriate medium, including but not limited to, a wireless medium, a wired medium, an optical cable, radio frequency (RF) or the like, or any appropriate combination thereof.

The program code used for executing the operations of the present disclosure may be written by using one or more programming languages or a combination thereof. The programming languages include an object-oriented programming language such as Java and C++, and also include a conventional procedural programming language such as "C" or similar programming languages. The program code may be completely executed on a user computing device, partially executed on a user device, executed as an independent software package, partially executed on a user computing device and partially executed on a remote computing device, or completely executed on a remote computing device or server. For the case involving a remote computing device, the remote computing device may be connected to a user computing device through any type of network including a LAN or a WAN, or may be connected to an external computing device (for example, through the Internet by using an Internet service provider).

Although several modules or units of a device for action execution are mentioned in the foregoing detailed descriptions, the division is not mandatory. Actually, according to the implementations of this application, the features and functions of two or more modules or units described above may be specified in one module or unit. Conversely, features and functions of one module or unit described above may be further divided into a plurality of modules or units to be specified.

In addition, although the various steps of the method in this application are described in a specific order in the accompanying drawings, this does not require or imply that the steps are bound to be performed in the specific order, or all the steps shown are bound to be performed to achieve the desired result. Additionally or alternatively, some steps may be omitted, a plurality of steps may be combined into one step for execution, and/or one step may be decomposed into a plurality of steps for execution, and the like.

Through descriptions of the foregoing implementations, it is easy for a person skilled in the art to understand that the exemplary implementations described herein can be implemented by software or by combining software with necessary hardware. Therefore, the technical solutions of the implementations of this application may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a mobile terminal, a network device, or the like) to perform the methods according to the implementations of this application.

After considering the specification and practicing the present disclosure, a person skilled in the art may easily conceive of other implementations of this application. This application is intended to cover any variations, uses or adaptive changes of this application following the general principles of this application, and includes the well-known knowledge and conventional technical means in the art and undisclosed in this application. The specification and the embodiments are merely considered as examples, and the actual scope and the spirit of this application are pointed out by the following claims.

What is claimed is:

1. A method for issuing a digital certificate to a node in a blockchain network, the method being performed by a computing device acting as a digital certificate issuing center, the digital certificate issuing center comprising a public-private key generation module, an authentication policy module and an authentication module, the method comprising:
  receiving a public-private key request from the node in the blockchain network;
  in response to the public-private key request, generating a public key and a private key for the node by using the public-private key generation module, and transmitting the public key and the private key to the node;

receiving the public key of the node and registration information of the node by using the authentication module;

obtaining a registration information authentication policy corresponding to the node from the authentication policy module by using the authentication module;

authenticating the registration information based on the registration information authentication policy corresponding to the node by using the authentication module, further including comparing a respective piece of the registration information with a corresponding security requirement in the registration information authentication policy corresponding to the node; and in accordance with a determination that the authentication succeeds, generating a digital certificate of the node by using the authentication module, establishing an association between the digital certificate and the public key of the node, and transmitting the digital certificate to the node, the digital certificate comprising plaintext information and a signature formed from the plaintext information by using a private key of the authentication module, for the node to verify the signature by using a public key of the authentication module, the plaintext information comprising the public key of the node.

2. The method according to claim 1, wherein the digital certificate issuing center further comprises a private key management module, and after the generating a public key and a private key for the node by using the public-private key generation module (TPKI_sdk), and transmitting the public key and the private key to the node, the method further comprises:

receiving, by using the private key management module, the private key transmitted by the node, and storing the private key.

3. The method according to claim 2, wherein the receiving the private key transmitted by the node comprises:

receiving a first random session key that is encrypted by using a public key of the private key management module by the node;

decrypting the encrypted first random session key by using a private key of the private key management module, to obtain the first random session key;

receiving the private key of the node that is encrypted by using the first random session key by the node; and decrypting the encrypted private key of the node by using the first random session key that is obtained through decryption, to obtain the private key of the node.

4. The method according to claim 3, wherein before the receiving a first random session key that is encrypted by using a public key of the private key management module by the node, the method further comprises:

receiving, by using the authentication module, a request to obtain a digital certificate of the private key management module transmitted by the node; and transmitting the digital certificate of the private key management module to the node according to the digital certificate obtaining request by using the authentication module, the digital certificate of the private key management module comprising a signature formed by using the private key of the authentication module, for the node to perform verification by using the public key of the authentication module after receiving the digital certificate of the private key management module.

5. The method according to claim 2, wherein after the receiving, by using the private key management module, the private key transmitted by the node, and storing the private key, the method further comprises:

receiving, from the node, a private key query request of the node by using the private key management module;

transmitting a digital certificate query request of the node to the authentication module by using the private key management module; and in accordance with a determination that a response that is generated by the authentication module according to the digital certificate query request indicates that authentication on the digital certificate of the node succeeds, transmitting the private key of the node to the node according to the private key query request by using the private key management module.

6. The method according to claim 5, wherein the transmitting the private key of the node to the node according to the private key query request comprises:

receiving a second random session key that is encrypted by using a public key of the private key management module by the node;

decrypting the encrypted second random session key by using a private key of the private key management module, to obtain the second random session key; and encrypting the private key of the node by using the second random session key, and transmitting the encrypted private key to the node, for the node to decrypt the encrypted private key of the node by using the second random session key, to obtain the private key of the node.

7. The method according to claim 5, wherein the registration information comprises an identifier of the node, and the digital certificate issuing center comprises an authentication database;

after the generating a digital certificate of the node by using the authentication module, the method further comprises:

correspondingly storing the identifier of the node and the digital certificate of the node in the authentication database by using the authentication module; and wherein the private key query request comprises the identifier of the node, and the digital certificate query request comprises the identifier of the node, for the authentication module to determine whether the authentication succeeds, according to whether a digital certificate correspondingly stored with the identifier is present in the authentication database.

8. The method according to claim 5, wherein the node comprises an organization node and a service provider node, and in accordance with a determination that the node is a service provider node, the receiving the public key of the node and registration information of the node comprises:

receiving the public key of the service provider node, the registration information of the service provider node, and permission information of an organization served by the service provider node;

in accordance with a determination that the digital certificate issuing center further comprises an authentication policy module, after the registration information is authenticated by using the authentication module, the method further comprises:

in accordance with a determination that the authentication succeeds, transmitting the permission information to the authentication policy module by using the authentication module for storage; and wherein the private key query request comprises an identifier of the service provider node and an identifier of a node to which a key to be queried by the service provider node belongs, and the authentication succeeds in accordance with a determination that the authentication module determines, according to the permission information stored by the authentication policy module, that the identifier of the node to which the key to be queried by the service provider node belongs is the identifier of the organization served by the service provider node or the service provider node.

9. The method according to claim 1, wherein the registration information authentication policy corresponding to the node comprises a registration information authentication policy specific to a type of the node;
the registration information comprises the type of the node; and
the obtaining a registration information authentication policy corresponding to the node from the authentication policy module comprises: obtaining the registration information authentication policy specific to the type of the node from the authentication policy module.

10. The method according to claim 1, wherein a blockchain comprises a plurality of sub-blockchains, and the generating a public key and a private key of the node for the node comprises:
generating, for the node, a public key and a private key of the node that are on a to-be-registered sub-blockchain;
the registration information comprises the to-be-registered sub-blockchain;
the obtaining a registration information authentication policy corresponding to the node from the authentication policy module comprises:
obtaining a registration information authentication policy corresponding to the to-be-registered sub-blockchain from the authentication policy module;
the authenticating the registration information based on the registration information authentication policy corresponding to the node comprises:
authenticating the registration information on the to-be-registered sub-blockchain based on the registration information authentication policy corresponding to the to-be-registered sub-blockchain; and
the plaintext information comprises a public key on a sub-blockchain on which authentication succeeds.

11. The method according to claim 5, wherein a blockchain comprises a plurality of sub-blockchains, the registration information comprises the type of the node, and the generating a public key and a private key of the node for the node comprises:
generating, for the node, public keys and private keys of the node that are on different sub-blockchains;
in accordance with a determination that the digital certificate issuing center further comprises the authentication policy module, after the authenticating the registration information by using the authentication module, the method further comprises:
generating, in accordance with a determination that the authentication succeeds, sub-blockchain permission information specific to the type of the node based on the type of the node by using the authentication module, and storing the sub-blockchain permission information in the authentication policy module, the sub-blockchain permission information comprising sub-blockchains that allow query for different service types;
the private key query request comprises the type of the node and a service type, the digital certificate query request comprises the type of the node and the service type, the authentication module queries the sub-blockchain permission information specific to the type of the node from the authentication policy module, determines, according to the sub-blockchain permission information and the service type, a sub-blockchain that allows query, puts the sub-blockchain that allows query into the response that indicates that authentication on a digital certificate succeeds, and transmits the response to the private key management module; and
the transmitting the private key of the node to the node comprises:
transmitting, to the node, a private key, on the sub-blockchain that allows query of the node.

12. The method according to claim 2, wherein the private key stored in the private key management module is stored in an encrypted manner, and a password for encryption is hard-coded in the private key management module.

13. A computing device acting as a digital certificate issuing center for issuing a digital certificate to a node in a blockchain network, the digital certificate issuing center comprising a public-private key generation module, an authentication policy module and an authentication module, the computing device comprising:
a memory, storing computer-readable instructions; and
a processor, configured to execute the computer-readable instructions stored in the memory, to perform a plurality of operations including:
receiving a public-private key request from the node in the blockchain network;
in response to the public-private key request, generating a public key and a private key of the node for the node by using the public-private key generation module, and transmitting the public key and the private key to the node;
receiving the public key of the node and registration information of the node by using the authentication module;
obtaining a registration information authentication policy corresponding to the node from the authentication policy module by using the authentication module;
authenticating the registration information based on the registration information authentication policy corresponding to the node by using the authentication module, further including comparing a respective piece of the registration information with a corresponding security requirement in the registration information authentication policy corresponding to the node; and
in accordance with a determination that the authentication succeeds, generating a digital certificate of the node by using the authentication module, establishing an association between the digital certificate and the public key of the node, and transmitting the digital certificate to the node, the digital certificate comprising plaintext information and a signature formed from the plaintext information by using a private key of the authentication module, for the node to verify the signature by using a public key of the authentication module, the plaintext information comprising the public key of the node.

14. The computing device according to claim 13, wherein the digital certificate issuing center further comprises a private key management module, and after the generating a public key and a private key for the node by using the public-private key generation module (TPKI_sdk), and transmitting the public key and the private key to the node, the plurality of operations further comprise:

receiving, by using the private key management module, the private key transmitted by the node, and storing the private key.

15. A non-transitory computer-readable program medium, storing computer-readable instructions for issuing a digital certificate to a node in a blockchain network, the computer-readable instructions, when being executed by a processor of a computing device acting as a digital certificate issuing center including a public-private key generation module, an authentication policy module and an authentication module, causing the computing device to perform a plurality of operations including:

receiving a public-private key request from the node in the blockchain network;

in response to the public-private key request, generating a public key and a private key for the node by using the public-private key generation module, and transmitting the public key and the private key to the node;

receiving the public key of the node and registration information of the node by using the authentication module;

obtaining a registration information authentication policy corresponding to the node from the authentication policy module by using the authentication module;

authenticating the registration information based on the registration information authentication policy corresponding to the node by using the authentication module, further including comparing a respective piece of the registration information with a corresponding security requirement in the registration information authentication policy corresponding to the node; and in accordance with a determination that the authentication succeeds, generating a digital certificate of the node by using the authentication module, establishing an association between the digital certificate and the public key of the node, and transmitting the digital certificate to the node, the digital certificate comprising plaintext information and a signature formed from the plaintext information by using a private key of the authentication module, for the node to verify the signature by using a public key of the authentication module, the plaintext information comprising the public key of the node.

16. The non-transitory computer-readable program medium according to claim 15, wherein the digital certificate issuing center further comprises a private key management module, and after the generating a public key and a private key for the node by using the public-private key generation module (TPKI_sdk), and transmitting the public key and the private key to the node, the plurality of operations further comprise:

receiving, by using the private key management module, the private key transmitted by the node, and storing the private key.

* * * * *